US006990231B2

(12) United States Patent
Goto

(10) Patent No.: US 6,990,231 B2
(45) Date of Patent: Jan. 24, 2006

(54) METHOD AND APPARATUS FOR FORMING AND DISPLAYING PROJECTION IMAGE FROM A PLURALITY OF SECTIONAL IMAGES

(75) Inventor: Yoshihiro Goto, Tokyo (JP)

(73) Assignee: Hitachi Medical Corporation, Tokyo (JP)

( * ) Notice: Subject to any disclaimer, the term of this patent is extended or adjusted under 35 U.S.C. 154(b) by 0 days.

(21) Appl. No.: 10/785,030

(22) Filed: Feb. 25, 2004

(65) Prior Publication Data

US 2004/0165766 A1    Aug. 26, 2004

Related U.S. Application Data

(63) Continuation of application No. 09/284,081, filed as application No. PCT/JP97/03174 on Sep. 9, 1997, now abandoned.

(30) Foreign Application Priority Data

Oct. 8, 1996  (JP)  .................................. 8-267292
Jun. 13, 1997 (JP)  .................................. 9-156689

(51) Int. Cl.
*G06K 9/00*  (2006.01)

(52) U.S. Cl. ...................................... 382/154; 382/128
(58) Field of Classification Search ................ 382/128, 382/131, 154, 293, 300; 378/4, 21, 74, 87, 378/98, 146; 345/419; 250/492.1, 200

See application file for complete search history.

(56) References Cited

U.S. PATENT DOCUMENTS 4,577,152 A * 3/1986 Macovski ................... 324/309
5,128,864 A * 7/1992 Waggener et al. ............ 378/14
5,307,264 A * 4/1994 Waggener et al. ............ 378/14
5,430,783 A * 7/1995 Hu et al. ...................... 378/15
5,647,018 A * 7/1997 Benjamin .................... 382/128
5,673,300 A * 9/1997 Reckwerdt et al. ........... 378/65
5,694,530 A   12/1997 Goto
5,720,291 A    2/1998 Schwartz (Continued)

FOREIGN PATENT DOCUMENTS

JP          63-64219 B     12/1988

(Continued)

OTHER PUBLICATIONS

P.J. Keller et al., "MR Angiography with Two-dimensional Acquisition and Three-dimensional Display—Work In Progress", *Radiology*, vol. 173, No. 2, Nov. 1989, pp. 527-532.

(Continued)

*Primary Examiner*—Kanjibhai Patel
(74) *Attorney, Agent, or Firm*—Antonelli, Terry, Stout and Kraus, LLP.

(57) ABSTRACT

The virtual three-dimensional image of an observed object is formed by arranging a plurality of sectional images and projected from a viewpoint fixed to a predetermined position onto a projection plane which is fixed to a predetermined position to form and display a perspective image. The pixel value on the sectional image which is transversed by a projection line extending from the viewpoint to the projection plane are read and, if the read value coincides with one of a plurality of predetermined values, pixel data are recorded in a pixel recording region corresponding to that value in pixel value memories. While the projection line scans the pixels one by one on the projection plane, for each coming scanned pixel the pixel data are recorded. After all the data are recorded, the pixel data recorded in the pixel value memories are read out and the data are displayed on a display as a perspective image.

81 Claims, 20 Drawing Sheets

U.S. PATENT DOCUMENTS

| | | |
|---|---|---|
| 5,740,222 A | 4/1998 | Fujita et al. |
| 5,900,878 A | 5/1999 | Goto et al. |
| 5,920,660 A | 7/1999 | Goto |

FOREIGN PATENT DOCUMENTS

| | | | |
|---|---|---|---|
| JP | 3-1845 A | 1/1991 |
| JP | 4-259454 A | 9/1992 |
| JP | 7-194616 A | 8/1995 |
| JP | A-7-210704 | 8/1995 |
| JP | A-7-296184 | 11/1995 |
| JP | 8-16813 A | 1/1996 |
| JP | 8-22537 A | 1/1996 |
| JP | 8-117221 A | 5/1996 |
| JP | A-8-335278 | 12/1996 |

OTHER PUBLICATIONS

Jun Nagai et al., *Three-dimensional CT Angiography*, May 30, 1994, p. 38, published by Medical Science International Co., Ltd., ISBN 4-89592-102-6.

\* cited by examiner

METHOD AND APPARATUS FOR FORMING AND DISPLAYING PROJECTION IMAGE FROM A PLURALITY OF SECTIONAL IMAGES

CROSS-REFERENCE TO RELATED APPLICATIONS

This application is a continuation of application Ser. No. 09/284,081 filed on Apr. 7, 1999 which is a 371 of PCT/JP97/03174, filed Sep. 9, 1997 now abandoned. The contents of application Ser. No. 09/284,081 are hereby incorporated herein by reference in their entirety.

TECHNICAL FIELD

The present invention relates to a projection image forming and displaying method and apparatus for obtaining a projection image on the basis of a plurality of sectional images from a medical image system, such as an X-ray CT system, an MRI system, an ultrasonic tomograph system, or the like, by which sectional images can be obtained.

BACKGROUND ART

Conventionally, as methods of this type, there are known a maximum value projecting and displaying method, an integrated value projecting and displaying method, etc., as shown in the following papers (1) and (2).
(1) P. J. Keller, B. P. Drayer, E. K. Fram, K. D. Williams, C. L. Dumoulin, S. P. Souza "MR Angiography with Two-dimensional Acquisition and Three-dimensional Display"; Radiology, November 1989, pp. 527–532
(2) Jun Nagai and Hideo Ando "Three-dimensional CT Angiography"; May 30, 1994,
    p. 38, published by Medical Science International Co., Ltd.

The maximum value projecting and displaying method, however, had a problem that the method was inferior in terms of separative display of internal organs because nothing but a projection image based on the maximum value of density was displayed. On the other hand, as shown in FIG. 21, the integrated value projecting and displaying method had a problem that the shadow of an internal organ d2 which is small in the distance of passage of projection line L was buried under the shadow of an internal organ d1 which is large in the distance of passage of projection line L because the shadow of the small internal organ d2 was thinner than the shadow of the large internal organ d1, etc. It was difficult to display those organs d1 and d2 under the condition that they are discriminated from each other. In FIG. 21, e designates a view point; L, view lines (projection lines); P, a plane of projection; and 11 to 14, sectional images. Relational formulae among the view point e, the view line L and the projection plane P are described in JP-A-8-16813.

An object of the present invention is to provide a projection image forming and displaying method and apparatus which is excellent in separative display of portion of object to be examined such as internal organs, etc. in sectional images, so that projection images of the respective parts sharply separated are obtained.

DISCLOSURE OF THE INVENTION

The present invention provides a projection image forming and displaying method using a volume image reconstructed from three-dimensionally measured data of MR or the like or a plurality of sectional images, in which a view point is set in an arbitrary position with respect to these sectional images so that each of the sectional images is projected from the view point onto a projection plane to thereby form a projection image. The method comprises a counting step, a weighting step and an image displaying step. In the counting step, distributive counting by pixel value is performed with respect to all the projection lines containing all the pixel positions on the projection plane in a manner so that a predetermined value, for example, 1, is added to a pixel position which is in a pixel value counting memory corresponding to each pixel value at a point of passage of a specific projection line on each sectional image when the specific projection line passes through the plurality of sectional images and which is the same as the pixel position on the projection plane onto which the point of passage is projected. In the weighting step, desired weighting corresponding to the pixel values is performed with respect to the count values recorded in the above counting step of performing distributive counting by pixel value. In the image displaying step, the data obtained in the weighting step are displayed as a projection image on a monitor screen.

Further, according to the present invention, the aforementioned projection image forming and displaying method comprises a marking recording step, a weighting step, and an image displaying step. In the marking recording step, marking recording is performed with respect to all the projection lines containing all the pixel positions on the projection plane in a manner so that a process of marking the passage of a specific projection line is made to a pixel position which is in a pixel value marking bit memory corresponding to each pixel value at a point of passage of the specific projection line on each sectional image when the specific projection line passes through the plurality of sectional images and which is the same as the pixel position on the projection plane onto which the point of passage is projected. In the weighting step, the total number of marks in the identical pixel positions in the respective pixel value marking bit memories is obtained with respect to all the pixel positions and performs required weighting corresponding to the pixel values with respect to the count values. In the image displaying step, the data obtained in the weighting step are displayed as a projection image on a monitor screen.

Memories are provided so as to correspond to the pixel values respectively. A sum of values in identical pixel positions of the memories is obtained. Desired weighting is applied to the sum. Data obtained by the weighting are displayed as projection images on the monitor screen. Accordingly, there are obtained projection images which are excellent in separate display of portion of object to be examined such as internal organs, etc., in sectional images and in which respective portions are separated sharply.

EMBODIMENTS OF THE INVENTION

Embodiments of the present invention will be described below with reference to the drawings.

Figure 1:
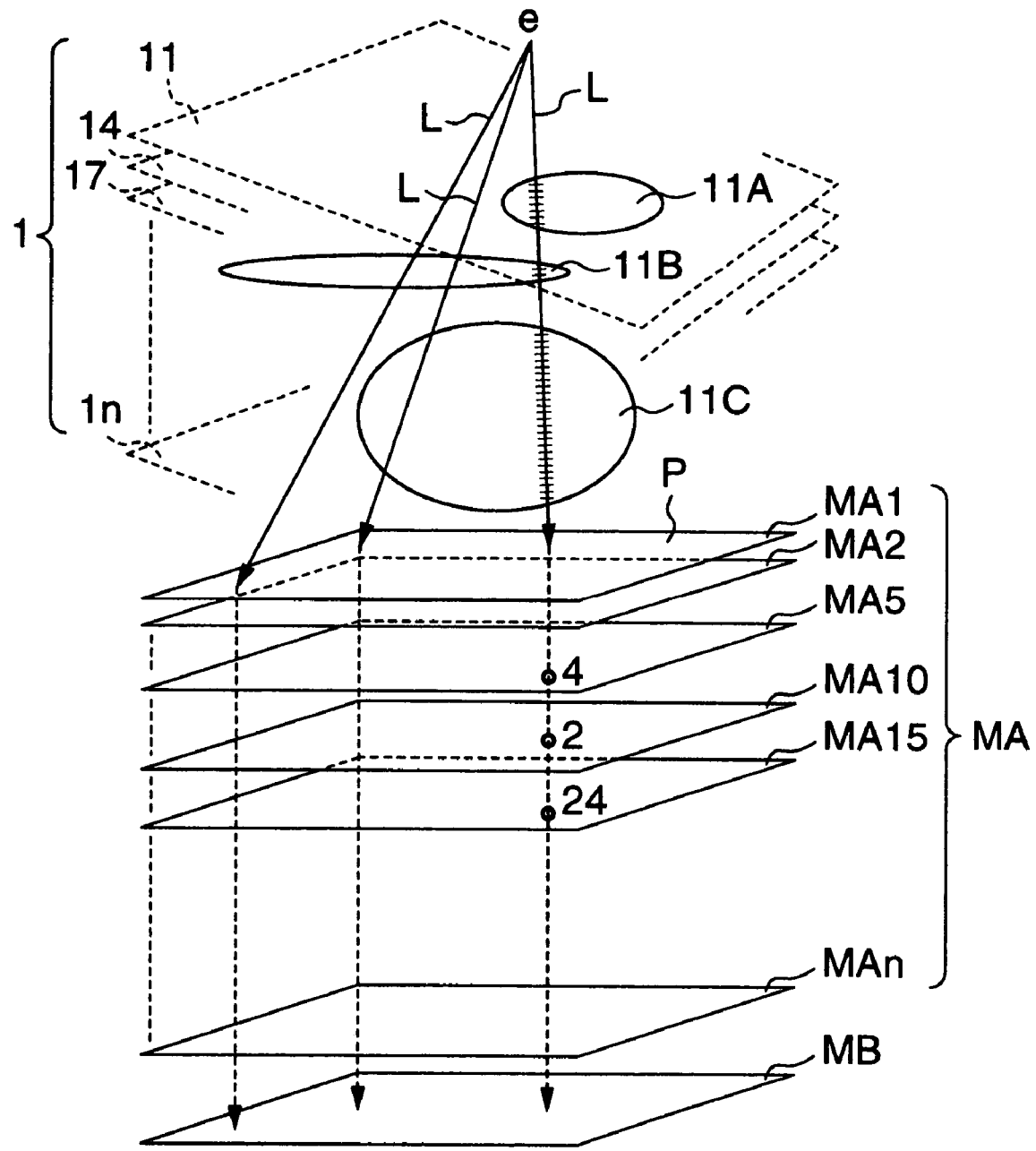
FIG. 1 is an explanatory view showing the theory of image processing in an embodiment of the present invention.

FIG. 1 is an explanatory view of an embodiment of a projection image forming and displaying method according to the present invention. In FIG. 1, e designates a view point; L, view lines or projection lines; and P, planes of projection.

The reference numeral 1 designates a volume image obtained by simultaneous reconstruction of a plurality of CT images from an X-ray CT system, a plurality of MRI images from an MRI system, a plurality of sectional images from an ultrasonic tomograph system or a solid image in a solid region having a required thickness. Hereinafter, a plurality of CT images will be described as an example. These CT images 11 to 1n are piled up in layers between a view point e and a projection plane P so that a virtual three-dimensional image space is formed.

Here, the position of the view point, the direction of the projection line, the position of the projection plane and the positions of the plurality of CT images are set suitably. Further, the CT images contain original images and CT images obtained by interpolation.

The reference numerals 11A, 11B and 11C designate identical pixel value regions, that is, identical CT value regions in the respective CT images 11 to 1n. These identical CT value regions may be two-dimensionally present only in one CT image or may be three-dimensionally present in a plurality of CT images adjacent to each other. The identical CT value regions 11A, 11B and 11C illustrated in the drawing are exemplified as three regions having CT values of 5, 10 and 15, respectively. Scale-like short cross lines on one and the same projection line L in the regions 11A, 11B and 11C show the positions of the CT images respectively and the points of passage of the projection line L through the CT images respectively. When a plurality of scale-like short cross lines on one and the same projection line are present in the identical CT value regions, it means that the identical CT value regions are three-dimensionally present over a plurality of CT images adjacent to each other.

MA designates CT value counting memories which are provided separately by CT value. MA1 is a memory for counting pixels having a first CT value, MA2 is a memory for counting pixels having a second CT value, ... MAn is a memory for counting pixels having an n-th CT value. Assuming now that the first CT value and the n-th CT value are 1 and 1000 respectively, for example, the first CT value counting memory MA1 is a memory for counting the CT value of 1, the second CT value counting memory MA2 is a memory for counting the CT value of 2, ... the n-th CT value counting memory MAn is a memory for counting the CT value of 1000. The number of CT value counting memories and the CT values to be recorded in the respective CT value counting memories are set suitably in accordance with the CT value range of an object to be displayed, the number of objects to be displayed, and so on.

Generally, a human body's tissue such as bone, skin, internal organ, or the like, forms CT images in a substantially uniform CT value or within a predetermined CT value range. Accordingly, if CT values are recorded in CT value counting memories separately by identical CT value or by predetermined CT value range, projection images separated on the basis of the human body's tissues can be formed.

These CT value counting memories MA1 to Man are not always necessary to be separated physically as shown in the drawing. That is, storage regions in one memory may be suitably allocated to these CT value counting memories.

As will be described later, MB is a product sum memory (display memory) for storing image data to be displayed, which are calculated by pixel on the basis of the CT value counting memories MA1 to MAn. This memory MB is not always necessary to be separated physically from the CT value counting memories MA.

Figure 2A:
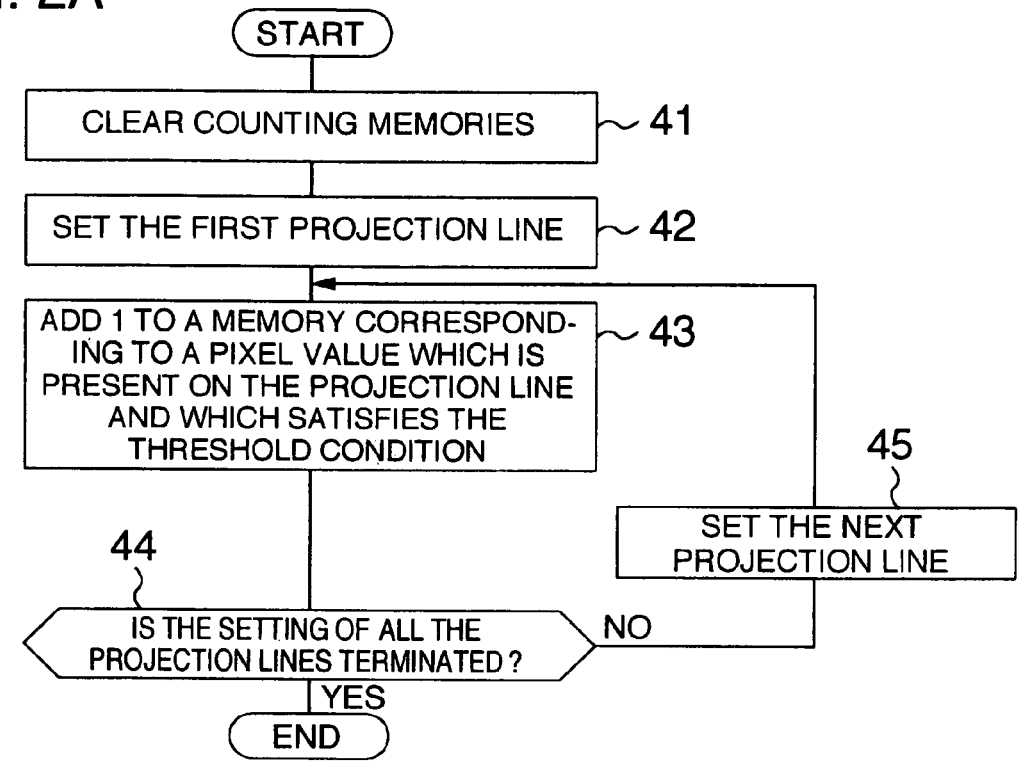
FIGS. 2A, 2B and 3 are flow charts showing execution procedures in the embodiment shown in FIG. 1.
Figure 2B:
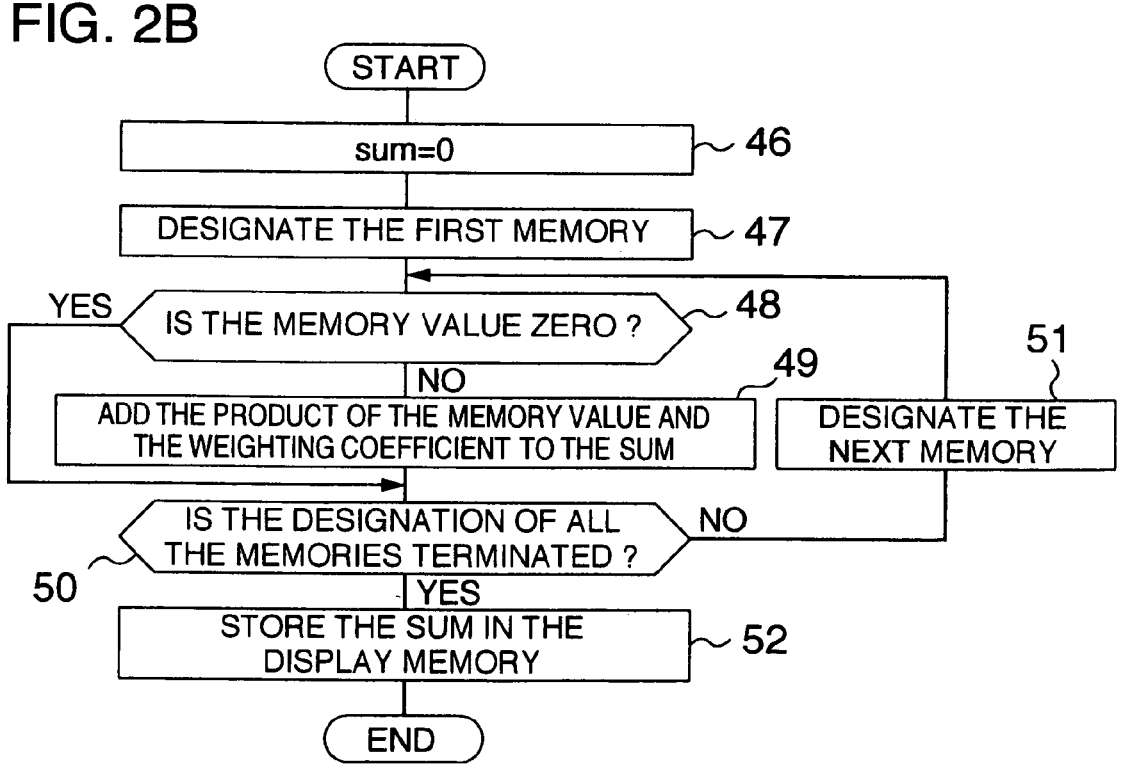

FIGS. 2A and 2B are flow charts each showing an example of a procedure for execution of the method of the present invention in the embodiment shown in FIG. 1. FIG. 2A shows a process (distributive counting process) for distributively measuring the positions of pixels in each CT image 1 before weighting in accordance with the CT values. FIG. 2B shows a process for weighting data read from the CT value counting memories MA.

As is obvious from FIGS. 1 and 2A, in this embodiment, CT value counting memories MA1 to MAn are prepared in advance by CT value. Whenever a specific projection line L passes through one of the CT images 11 to 1n, a predetermined value, for example, 1 is added to a pixel position which is in a CT value counting memory MA corresponding to the CT value at a point of passage of the projection line L on the CT image 1 and which is identical to the pixel position on the projection plane P onto which the point of passage is projected. The projection line is moved successively to cover all pixel positions on the projection plane P. The aforementioned adding process is executed whenever the projection line is moved, that is, by pixels. This procedure of execution will be described more in detail with reference to FIG. 2A.

That is, in FIG. 2A, all the CT value counting memories MA1 to MAn are cleared in step 41, and a first projection line L1 is set in step 42. Usually, a projection line L1 is set to run toward the position of a projection plane P corresponding to the left upper corner portion of a monitor screen which will be described later.

In step 43, pixel values at respective points of passage of the projection line L1 on the CT images 11 to 1n, that is, CT values, are read out. Only in the case where the CT value read out thus are suitable to a threshold condition indicating upper and lower limits of a required CT value range, 1 is added to the pixel position which is in a counting memory corresponding to the CT value and which is the same as the pixel position on the projection plane P onto which the point of passage (pixel position) is projected. That is, the respective numbers of times of passage of the projection line L1 are counted up by pixel value in the memories MA. After the projection line L1 passes through all the CT images 11 to 1n, the situation of the process goes to step 44. Incidentally, configuration can be made so that the read CT value within a predetermined range is counted by the CT value counting memory. Further, the operation in the step 43 is known in JP-A-8-16813. This literature is incorporated into the disclosure of the application.

In step 44, a judgment is made as to whether setting of all projection lines L1 to Lm is terminated or not. If the judgment is affirmative (YES), the process is terminated, while if negative (NO), the situation of the process skips to step 45.

In step 45, the next projection line L2 is set and the situation of the process goes back to the step 43. Thereafter, the steps 43 to 45 are repeated until the judgment is YES in the step 44. Incidentally, the judgment is YES in the step 44 at the point of time when the last projection line Lm is set, that is, generally, the projection line which goes toward the position of a projection plane P corresponding to the right lower corner portion of the monitor screen is set and the process with respect to the projection line Lm in the step 43 is terminated.

The process of distributively counting the pixel positions of the CT images 1 respectively by CT value is finished in the above manner. Thus, recording of count values about all the pixel positions of CT value counting memories MA1 to MAn is obtained.

Although the above description has been made about the case where the unit step length of the projection line L, that is, the pixel value reading interval when pixel values are read-in while the projection line L goes toward the projection plane P, is the same as the distance between adjacent CT images, these are not always coincident with each other. It may be considered that only the pixel values of coincident CT images 1 are selectively subjected to the aforementioned counting process when there is some incoincidence. Alternatively, when there is some incoincidence, that is, when there is no CT image set to be piled up in the step position in advance, pixel values in this portion may be obtained by interpolation (see JP-A-8-335278 proposed by the applicant of the present application) on the basis of pixel values in adjacent CT images so as to be subjected to the aforementioned counting process. Further, the unit step length may be equal to the length of one pixel or may be smaller than it.

The image data which are recorded in the CT value counting memories MA1 to MAn separately by CT value obtained by the procedure of FIG. 2A express human body's tissues or internal organs specified by the CT values respectively. Accordingly, a desired internal organ to be observed can be displayed emphatically or individually by being separated from others.

After the counting process of FIG. 2A is finished, only data in a CT value counting memory MA having a specific CT value or a specific CT value range stored thereon are selectively displayed in order to display separately or emphatically a required portion of object to be examined in a specific internal organ, or the like, or data are weighted for every CT value counting memory so as to be displayed emphatically. FIG. 2B is a view showing an example of the procedure for carrying out a product-sum process in the CT value counting memories MA1 to MAn corresponding to only the first projection line L1, for the sake of simplification of explanation.

In FIG. 2B, in step 46, first, the temporary storage pixel data memory sum in a main memory is cleared to zero. Then, in step 47, the first CT value counting memory MA1 is designated.

In step 48, a judgment is made as to whether the memory value (recorded count value) in the memory MA1 with respect to the first projection line L1, that is, the memory value in a corresponding position of a projection plane P corresponding to the left upper corner portion of the monitor screen is zero or not. If the value is zero, the situation of the process skips to step 50. If the value is not zero, the situation of the process goes to step 49. The step 48 is particularly useful in the case of the method of the present invention using bit maps which will be described later. In the embodiment shown in FIG. 1, although the step 48 is not always required, no obstacle is generated even if the step 48 is provided.

In step 49, the aforementioned memory value is multiplied by a weighting coefficient and the resulting product is added to the pixel data memory sum. Then, the situation of the process goes to step 50. Incidentally, weighting will be further described later.

In step 50, a judgment is made as to whether all the CT value counting memories MA1 to MAn are designated. If YES, the situation of the process goes to step 52. If NO, the situation of the process skips to step 51.

In step 51, the next CT value counting memory MA, that is, the memory MA2 for counting the CT value of 2 is designated and the situation of the process skips to step 48. Thereafter, the steps 51 and 48 to 50 are repeated until the judgment in the step 50 is YES.

In step 52, pixel data on the pixel data memory sum are stored in a corresponding storage region of the display memory (product sum memory) MB.

A weighting process with one projection line has been described above. Thereafter, the aforementioned weighting process is repeated for all the projection lines L1 to Lm.

Figure 3:
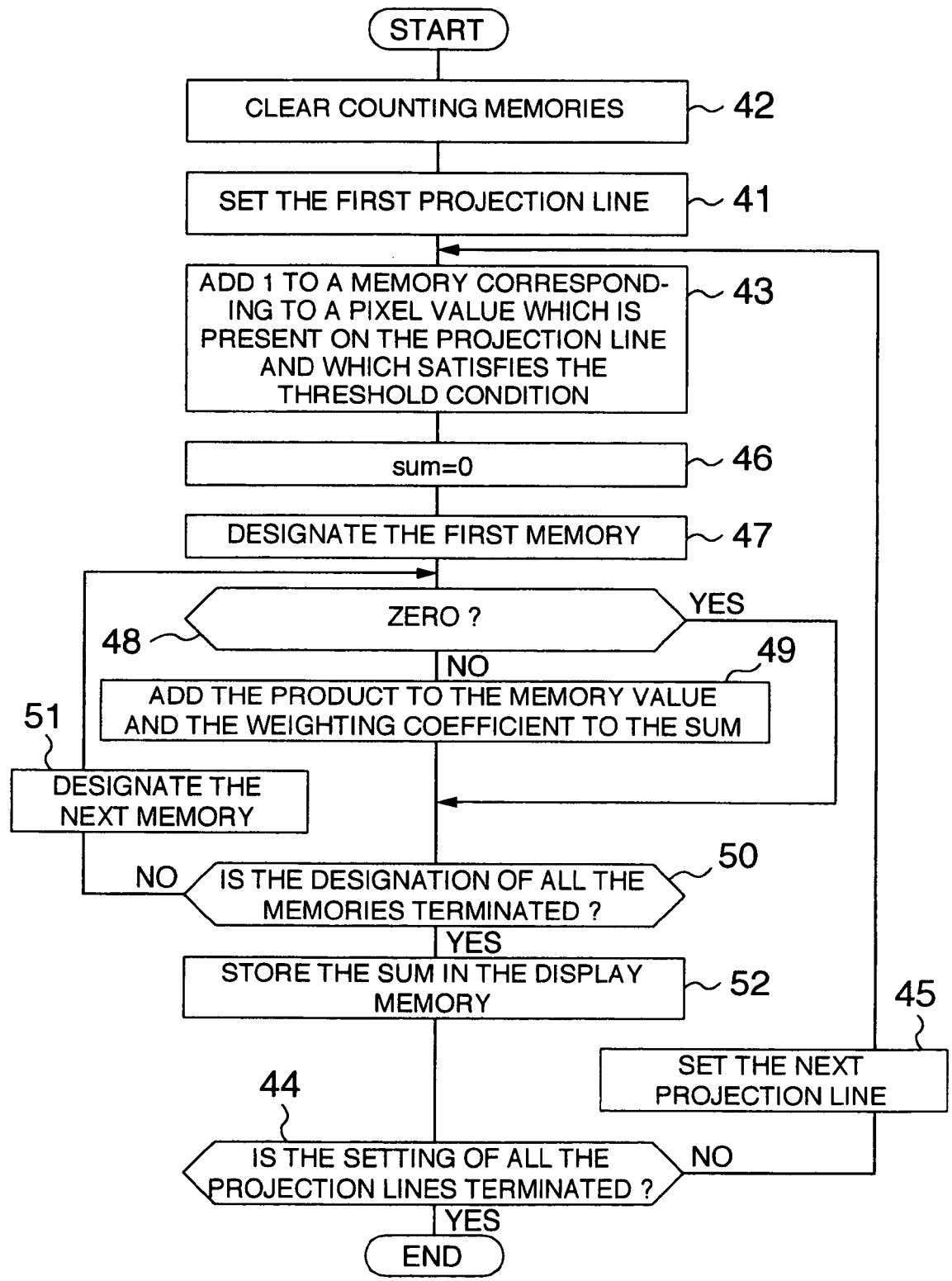

Although the aforementioned embodiment has been described about the case where all steps are executed in two stage processes as shown in FIGS. 2A and 2B, all steps may be executed in a continuous process as shown in FIG. 3.

In FIG. 3, the reference characters are referenced correspondingly to steps the same as or identical to those in FIGS. 2A and 2B and the description thereof will be therefore omitted. As apparent from comparison of FIG. 3 with FIGS. 2A and 2B, FIG. 3 is designed so that the change setting of the projection line L is performed in the final step 44. That is, in FIG. 3, the distributive counting process is performed by CT value in the respective pixel positions in each CT image 1 with respect to a specific projection line L. After the recorded count values are weighted, the next projection line L is set and the counting process and the weighting process are performed successively in the aforementioned manner. Thereafter, these processes are repeated until the processes are completed with respect to the last projection line Lm.

In such a manner, the sequences of the processes and steps may be desirably changed so long as the counting and weighting processes have been performed on all the projection lines L1 to Lm (all the pixels on the projection plane P) and the results have been stored in the display memory (product sum memory) MB.

If the weighting coefficient for the image of the CT value which is not necessary to display is made zero, the image of this CT value can be erased. A high weighting coefficient may be given to the image of the CT value which is required to be observed, while emphatically, a low weighting coefficient may be given to the image of the CT value which is required to be weakened.

If the image data thus obtained in the display memory MB are displayed on a display unit, images of required CT values can be displayed emphatically and images of unnecessary CT values can be erased. Further, in the CT images 11 to 1n, an image of identical CT value having a thickness in the direction of stack becomes large in the value recorded on the CT value counting memory. Accordingly, the image displayed on the display unit is designed so that a portion thicker in the direction of stack is displayed more densely correspondingly. Accordingly, the characteristic of a projection image can be expressed well.

Figure 4:
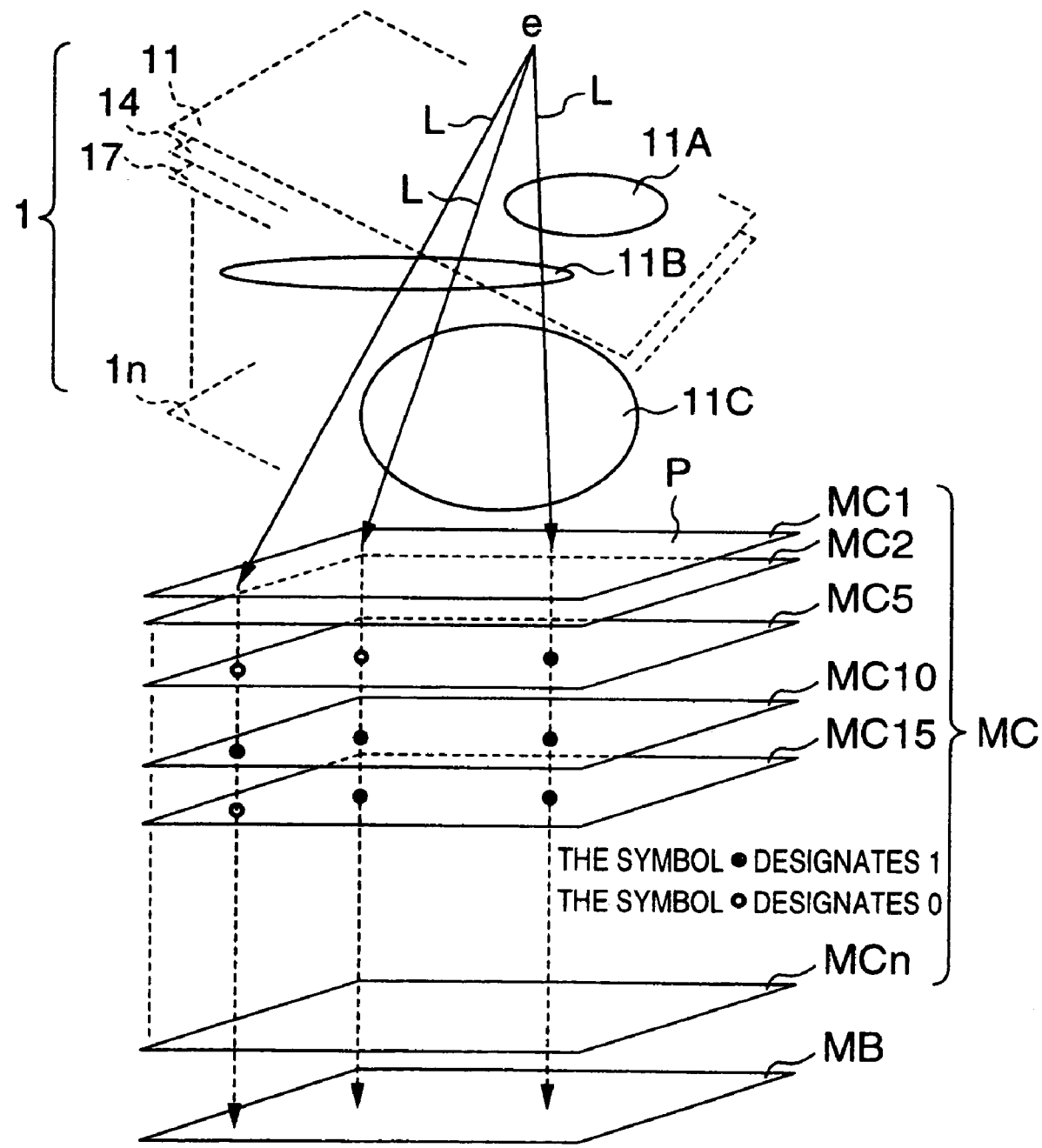
FIG. 4 is an explanatory view showing the theory of image processing in another embodiment of the present invention.

FIG. 4 is an explanatory view of a second embodiment of the projection image forming and displaying method. In FIG. 4, parts the same as or equivalent to those in FIG. 1 are referenced correspondingly.

MC1 to MCn are CT value marking bit memories which are provided separately by CT value. MC1 is a first CT value marking bit memory; MC2 is a second CT value marking bit memory; . . . MCn is an n-th CT value marking bit memory. Assuming now that the first CT value is the CT value of 1 and the n-th CT value is the CT value of 1000, the first CT value marking bit memory MC1 is a bit memory for marking the CT value of 1, the second CT value marking bit memory MC2 is a bit memory for marking the CT value of 2, and the n-th CT value marking bit memory MCn is a bit memory for marking the CT value of 1000.

The CT values corresponding to the respective numbers of the CT value marking bit memories MC1 to MCn are set suitably in accordance with the number of used CT value marking bit memories, the CT value range of an object to be formed and displayed, etc. These memories MC1 to MCn are not always necessary to be separated physically as shown in the drawing. Storage regions in one memory may be allocated suitably to the memories MC1 to MCn. This rule applies also to the display memory MB.

Figure 5:
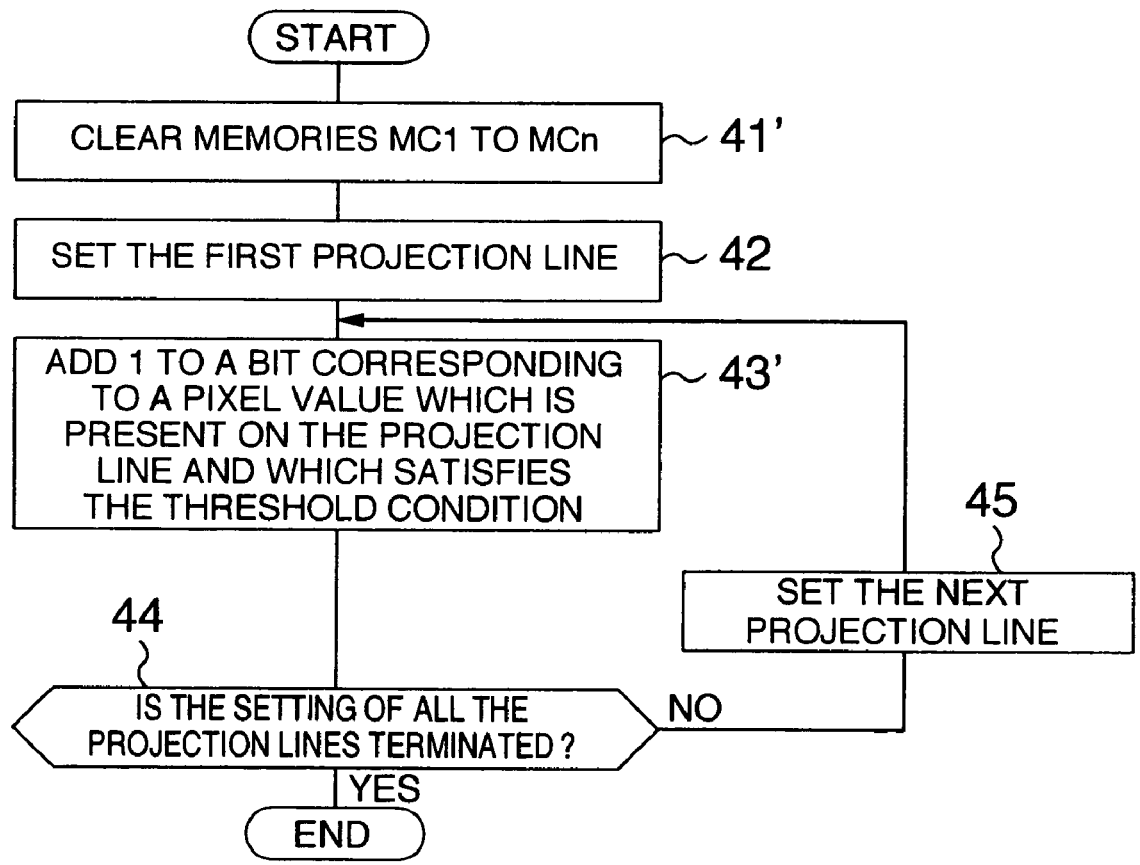
FIG. 5 is a flow chart showing an execution procedure in the embodiment shown in FIG. 4.

FIG. 5 is a flow chart showing an example of the procedure in the method of the present invention shown in FIG. 4. CT values are read on the respective pixel positions in the CT images 11 to 1n through which each projection line passes. Data as to the presence/absence of passage of the projection line are recorded as marks in the CT value marking bit memories MC1 to MCn separately by CT value for every projection line.

That is, as apparent from FIGS. 4 and 5, CT value marking bit memories MC1 to MCn are prepared in advance for every the CT value. Further, a process for marking and recording the passage of a specific projection line L in a pixel position which is on a CT value marking bit memory MC corresponding to the CT value at a point of passage on each of the CT images 11 to 1n when the specific projection line L passes through each of the CT images 11 to 1n and which is the same as the pixel position of a projection plane P onto which the point of passage is projected, is carried out with respect to all the projection lines containing all the pixel positions of the projection plane P corresponding to the size of the display memory (product sum memory) MB.

In FIG. 5, all the CT value marking bit memories MC1 to MCn are cleared in step 41' and the first projection line is set in step 42. Usually, the first projection line is a projection line L2 which goes toward a portion on a projection plane P corresponding to the left upper corner portion of the monitor screen.

In step 43', when a pixel value satisfies the threshold (upper limit, lower limit, etc.) condition for limiting the CT value range required for observation with respect to the CT value at each point of passage of the aforementioned projection line L1 through the CT images 11 to 1n, a mark "1" indicating the presence of passage is set in a pixel position which is in a marking bit memory MC of a CT value corresponding to the pixel value and which is the same as the pixel position on the projection plane P onto which the point of passage (pixel position) is projected.

Accordingly, the passage of the projection line L1 is marked by pixel value (CT value). After the projection line L1 passes through all the CT images 11 to 1n, the situation of the process goes to step 44.

Although the correspondence between the pixel value and the CT value can be determined suitably, each CT value marking bit memory may be designed so that the mark "1" is set when a CT value within the predetermined range is detected. Further, even in the case where the projection line L1 passes through the same pixel value of the CT images 11 to 1n several times, the mark "1" set at the time of first passage through the pixel value is not changed at all.

In step 44, a judgment is made as to whether setting of all the projection lines L1 to Lm is terminated or not. If YES, the process is terminated. If NO, the situation of the process skips to step 45.

In step 45, the next projection line L2 is set and the situation of the process goes back to the step 43'. Thereafter, the steps 43', 44 and 45 are repeated until the judgment is YES in the step 44. Incidentally, the judgment becomes YES in the step 44 when the final projection line Lm, that is, usually, a projection line which goes toward a position on a projection plane P corresponding to the right lower corner portion of the monitor screen, is set and the process of the step 43' with respect to the projection line Lm is terminated.

Thus, the process of marking the presence/absence of passage by the CT value with respect to each pixel position in the respective CT images 1 is terminated, and recording of the presence/absence of the mark "1" is obtained with respect to all the pixel positions (all the pixel positions corresponding to all the pixel positions on the projection line P) of all the CT value marking bit memories MC1 to MCn.

After the aforementioned marking recording process is completed, weighting is performed in the same manner as that in FIG. 2B for the purpose of separate display and emphatical display of a specific CT value or a specific CT value range with respect to the marking recording value, that is, a portion of object to be examined such as an internal organ, or the like, in the CT images 1. In this case, "memory" in FIG. 2B may be replaced by "bit memory".

In the second embodiment described above, the presence/absence of a pixel having a predetermined CT value on each projection line is merely recorded. Accordingly, if the process shown in FIG. 2B is applied to all projection lines so that image processing data are recorded in the pixel memory and displayed on the monitor, an image of a CT value selected and displayed is formed so that the plane form of the observed object from the view point e is displayed. Accordingly, even in the case where the observed object portion has a certain thickness in the direction of stack of the CT images, the size of the thickness has no influence on the projection image.

Incidentally, also in the aforementioned second embodiment, the interpolation of CT images (pixel values), the length of unit step length, etc. in the case where there is no coincidence in the unit step length of the projection line L are the same as those in the first embodiment shown in FIG. 1.

For example, methods described in JP-A-7-210704, JP-A-7-296184 proposed by the applicant of the present invention may be applied to the transformation (coordinate transformation) of each of pixel positions of the CT images 11 to 1n to a pixel position on the projection plane P in the embodiments shown in FIGS. 1 and 4.

Figure 6:
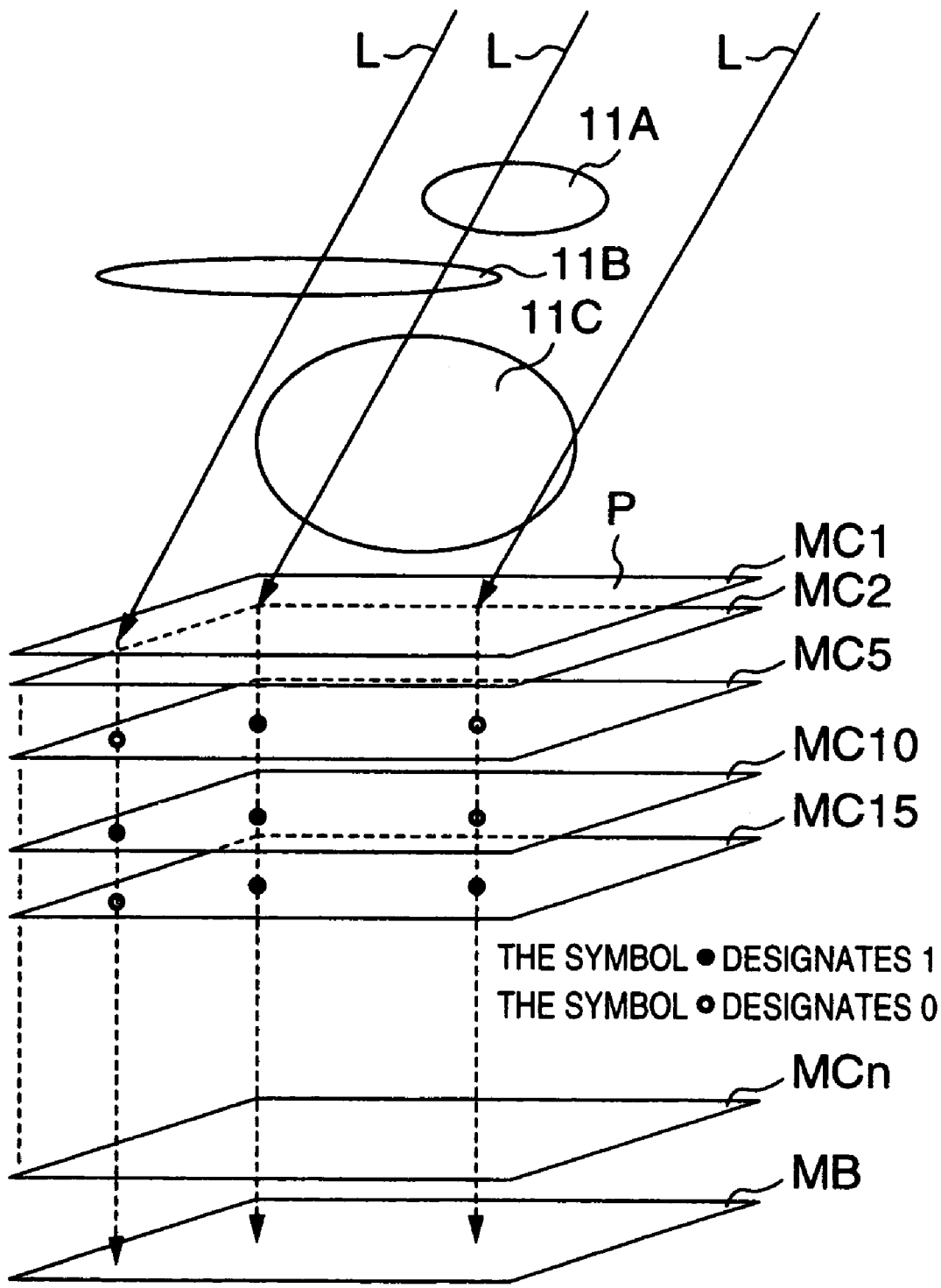
FIG. 6 is an explanatory view showing a further embodiment of the present invention.

Although the embodiments shown in FIGS. 1 and 4 have been described about the case where a central projection method is used as a method of projecting the plurality of CT images 11 to 1n onto the projection plane P, a parallel projection method may be used for projection as shown in FIG. 6. FIG. 6 shows an example in which such a parallel projection method realized by carrying the view point e away to an infinite far point is applied to the embodiment shown in FIG. 4. The parallel projection method may be applied to the embodiment shown in FIG. 1. In FIG. 6, parts the same as or equivalent to those in FIG. 4 are referenced correspondingly and the description thereof will be omitted.

As a result of the aforementioned process, projection images are formed in the display memory (product sum memory) MB. When the data are D/A-converted to be given to the monitor, projection images 71 are displayed on the monitor.

Figure 7A:
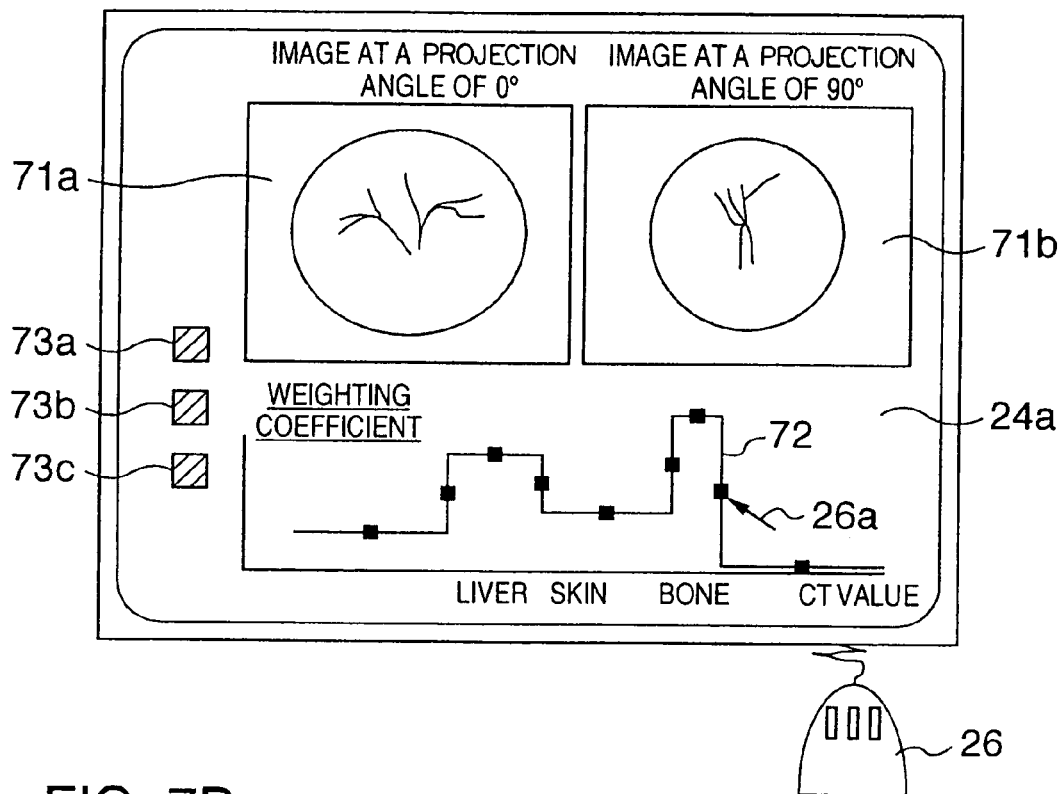
FIGS. 7A and 7B are views each showing an example of monitor display of a projection image obtained by execution of a method according to the present invention.
Figure 7B:
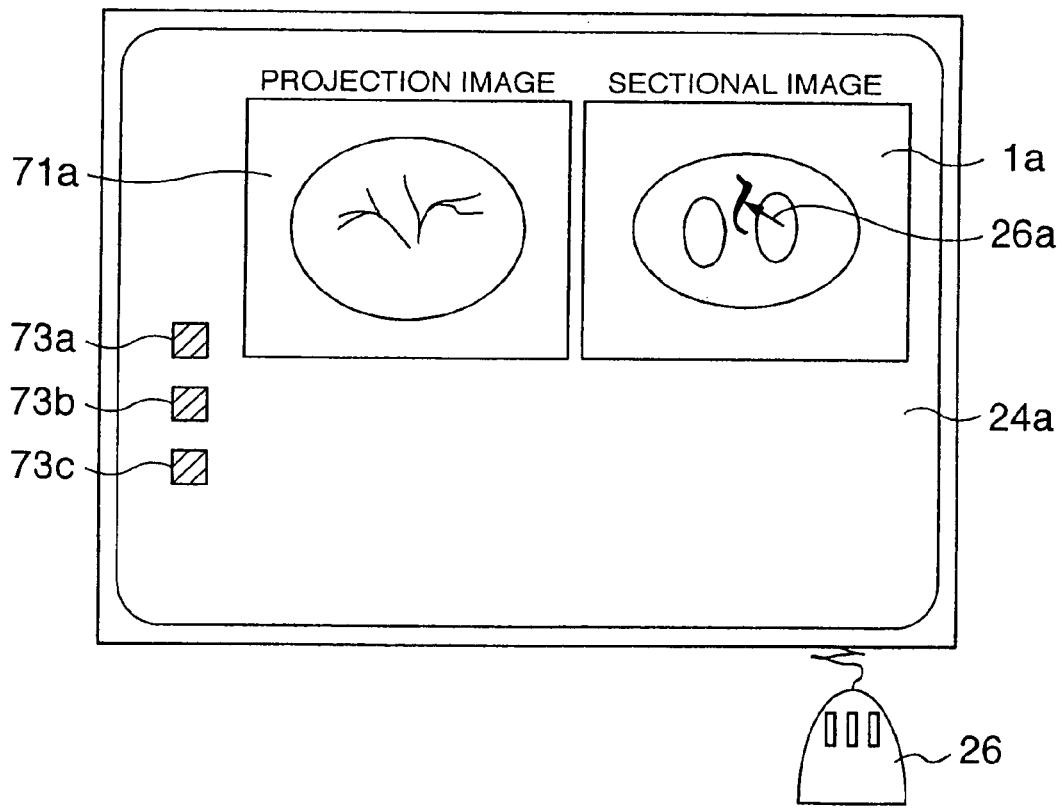

FIGS. 7A and 7B are views each showing an example in which projection images, information pertinent thereto, etc. are displayed on the monitor screen 24a.

In FIG. 7A, a projection image 71a shows an example of display in the direction of the view line (projection angle) of 0°, and a projection image 71b shows an example of display in the case where the same image is observed from the direction of the view line of 90°. In FIG. 7A, the two projection images 71a and 71b of the one and same observed object seen from different view line directions are displayed side by side.

If the counting process is carried out in accordance with the CT values on the basis of the first embodiment shown in FIGS. 1 through 3, portions or internal organs of each CT value can be displayed separately or emphatically when weighting coefficients are set separately by CT value. With respect to the method of setting the weighting coefficients, as shown in FIG. 7A, when a weighting coefficient curve 72 with the CT value as the abscissa axis and with the weighting coefficient as the ordinate axis is modified while being displayed, setting of arbitrary weighting with respect to each CT value can be performed. Specifically, three kinds of weighting coefficient curves set in advance are registered in a memory. When one of three weighting coefficient curve selection buttons 73a, 73b and 73c displayed is pointed by the cursor so as to be selected, a weighting coefficient curve 72 corresponding to the button is displayed as shown by the curve 72 in FIG. 7A.

To correct the weighting coefficient curve 72, one of small rectangular markers displayed on respective sides of the curve can be designated by the cursor to move the designated side up and down or left and right to thereby change a part of the curve.

Although FIG. 7A shows the case where the characteristic curve is shaped rectangularly, a continuous wave-like curve may be used. When one of a large number of markers displayed on the curve is moved up and down by the cursor, the curve can be corrected.

The display of the curve and the moving correction of the displayed curve by the cursor as described above are realized by direct application of a technique generally well known in the field of computers. Further, an available technique in the field of computers is applied to a technique of displaying the characteristic curve corresponding to the respective physical quantities of the abscissa and ordinate axes.

FIG. 7B shows an example in which the aforementioned projection image 71a and one CT image 1a selected suitably from the plurality of CT images 11 to 1n as the original image of the projection image 71a are displayed side by side. Here, each weighting coefficient curve 72 selected by the weighting coefficient selection button 73a, 73b or 73c is set so as to have one peak. The projection view 71a shows an example in which a projection image obtained when the density value of an arbitrary portion in the CT image 1a designated by the mouse cursor 26a is weighted as a peak is displayed. Incidentally, for example, in the case of X-ray CT images, the peak is equivalent to large X-ray absorption.

Incidentally, the display of the plurality of images as shown in FIGS. 7A and 7B is performed by use of a general image processing technique in which image data corresponding to the images are temporarily stored in the display memory on the basis of the designation of addresses by image so that the image data are displayed just as they are on the monitor.

FIGS. 8A to 8D show examples in each of which the weighting coefficient curve 72 is changed. As described above, the shape of the weighting coefficient curve 72 can be corrected by the operation of the mouse cursor 26a on the monitor screen 24a with these exemplified curves 72 as standard shapes. Further, the corrected weighting coefficient curve 72 may be registered in a magnetic disk, or the like, so that the curve can be used again.

Figure 9A:
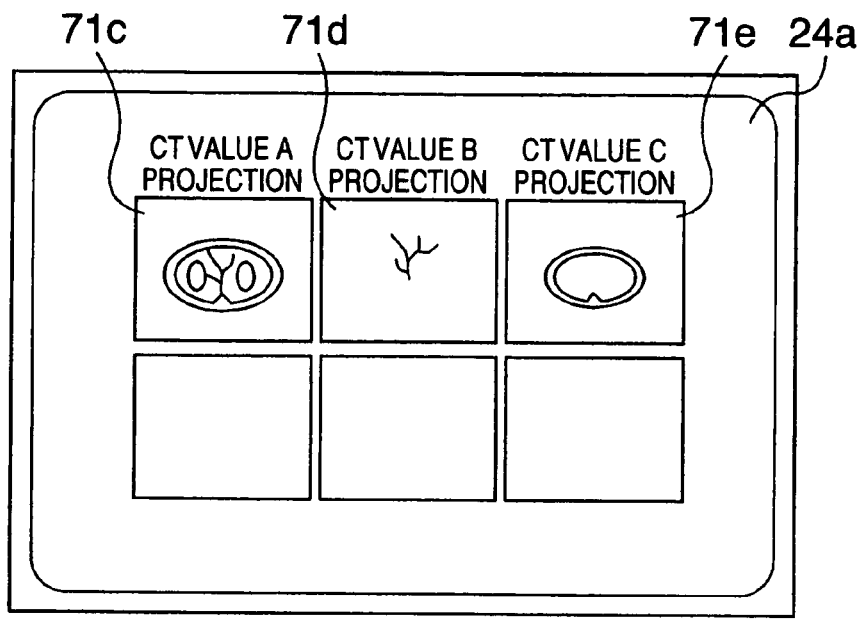
FIG. 9A is a view showing another example of monitor display of a projection image obtained by the method of the present invention.
Figure 9B:
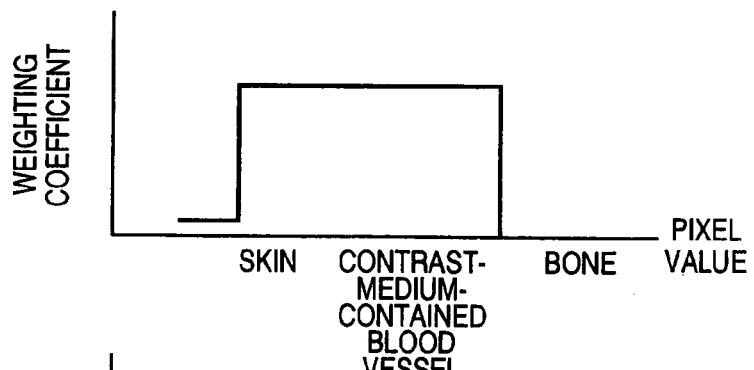
FIGS. 9B, 9C and 9D are graphs respectively showing weighting coefficient curves for providing three displays shown in FIG. 9A.
Figure 9C:
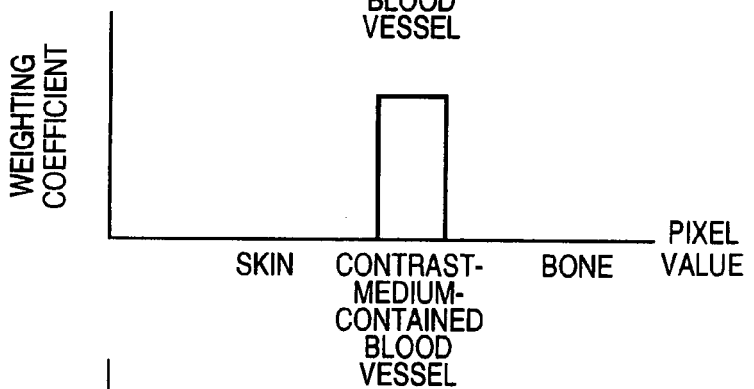
Figure 9D:
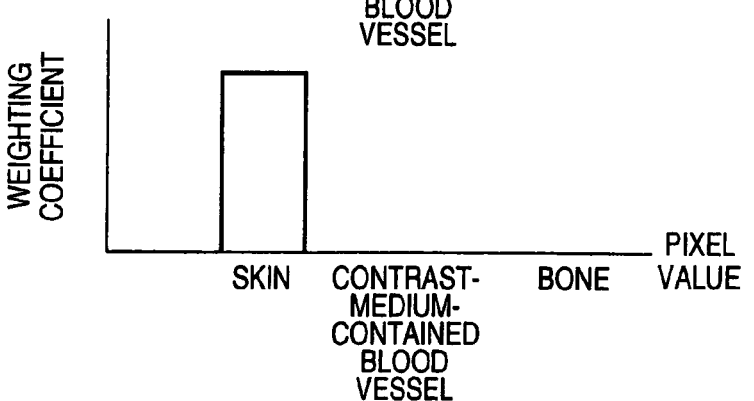

FIG. 9A is a view showing an example in which three kinds of projection images are displayed side by side on the monitor in the case where different weighting coefficient curves are given to one and the same portion of object to be examined. The displayed image 71c is a projection image which is obtained when a weighting coefficient is given only to the CT value in the portions of skin and contrast-medium-contained blood vessel in accordance with the weighting curve shown in FIG. 9B. The displayed image 71d is a projection image which is obtained when weighting is given to the CT value only in the portion of contrast-medium-contained blood vessel as shown in FIG. 9C. Further, the displayed image 71e is a projection image which is obtained when weighting is given only to the CT value in the portion of skin as shown in FIG. 9D.

Figure 8A:
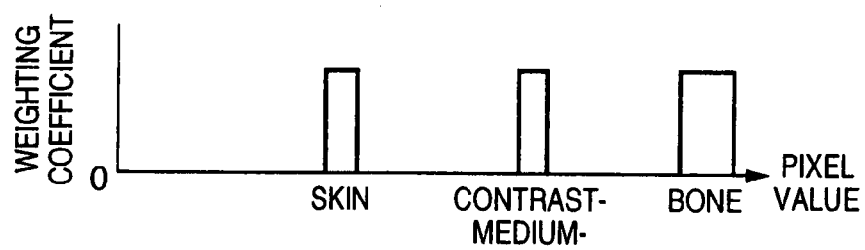
FIGS. 8A to 8D are graphs each showing an example of a weighting coefficient curve according to the present invention.
Figure 8B:
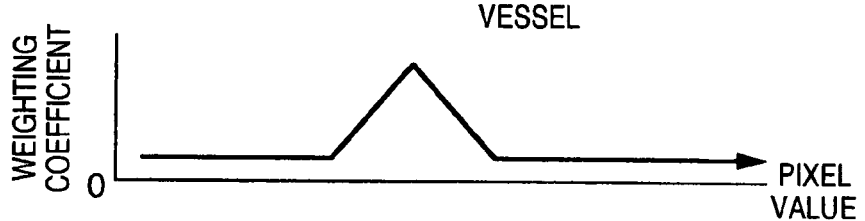
Figure 8C:
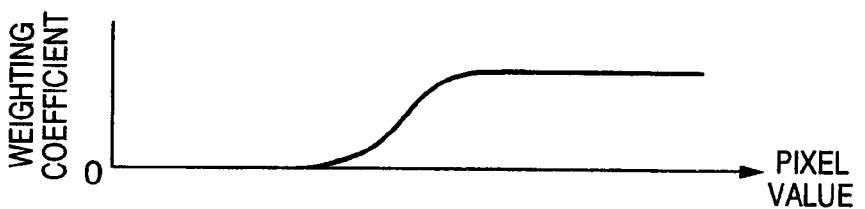
Figure 8D:
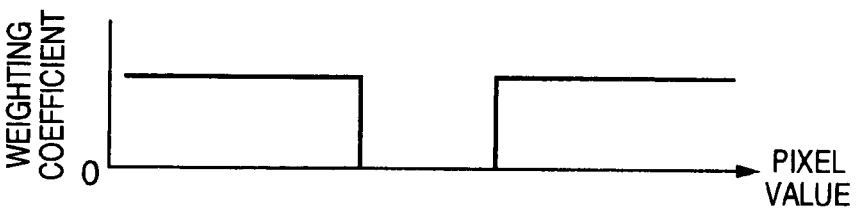

As shown in FIGS. 7A and 8A, if the name of each portion of object to be examined such as liver, skin, bone, etc. in CT images is additionally displayed in a position taken laterally on the monitor screen and correspondingly to the CT value when the weighting coefficient curve 72 is displayed on the monitor, the shape of the weighting coefficient curve 72 can be corrected easily on the basis of a visual appeal when a required portion is to be displayed separately or emphatically. The additional display of the name of such a portion can be performed by use of a well-known image processing technique.

A further set of distance memories (Z buffers) are added so as to make pairs with the CT value counting memories MA or CT value marking bit memories MC respectively. The distance from the view point e to the nearest pixel position on each projection line L is recorded. This countermeasure is useful for the application of hidden-surface elimination (Z buffer method) in which nearer pixels are displayed while farther pixels are erased in the case where two or more pixels are superimposed in one and the same position on the projection plane P. Further, if the respective distances on the projection line L from the view point e to pixels to be displayed are recorded, shading (depth method) can be applied so that the nearer pixels are displayed more lightly. The aforementioned display can be achieved by use of a technique described in JP-A-8-16813. This literature is incorporated into the disclosure of the present invention.

In the embodiment shown in FIG. 1, the CT value counting memories MA1 to MAn have one-to-one correspondence with the CT values, that is, the first CT value counting memory MA1 is a memory for counting the CT value of 1, the second CT value counting memory MA2 is a memory for counting the CT value of 2, . . . . Alternatively, one-to-plurality correspondence may be provided. For example, the first CT value counting memory MA1 may be a memory for counting the CT values of from 1 to 10, the second CT value counting memory MA2 may be a memory for counting the CT values of from 11 to 20, . . . . By this measure, the number of CT value counting memories MA can be reduced so that memory saving can be attained.

Further, in the embodiment shown in FIG. 1, each CT value counting memory MA can be regarded as thickness data in the region of the CT value. Accordingly, the gradient of density is calculated on the basis of the thickness data so that a shaded image can be obtained. This density gradient may be provided among a plurality of CT value counting memories. The image displayed in the aforementioned manner is formed so that a portion larger in gradient is expressed darkly.

In the embodiments shown in FIGS. 1 and 4, the threshold process (see the steps 43 and 43' in FIGS. 2A, 3 and 5) is applied to respective pixel values (CT values) in each CT image 1. Alternatively, the threshold process may be omitted. In this case, all range (all region) of pixel values (CT values) is a subject to be formed and displayed, so that a projection image equivalent to a general X-ray projection image is obtained.

Further, in the embodiments shown in FIGS. 1 and 4, one required memory MA or MC may be selected or a plurality of required memories MA or MC are selected without weighting or with uniform weighting so that a projection image processed as shown in FIG. 2A, 3 or 5 is formed and displayed only by this means.

Figure 20:
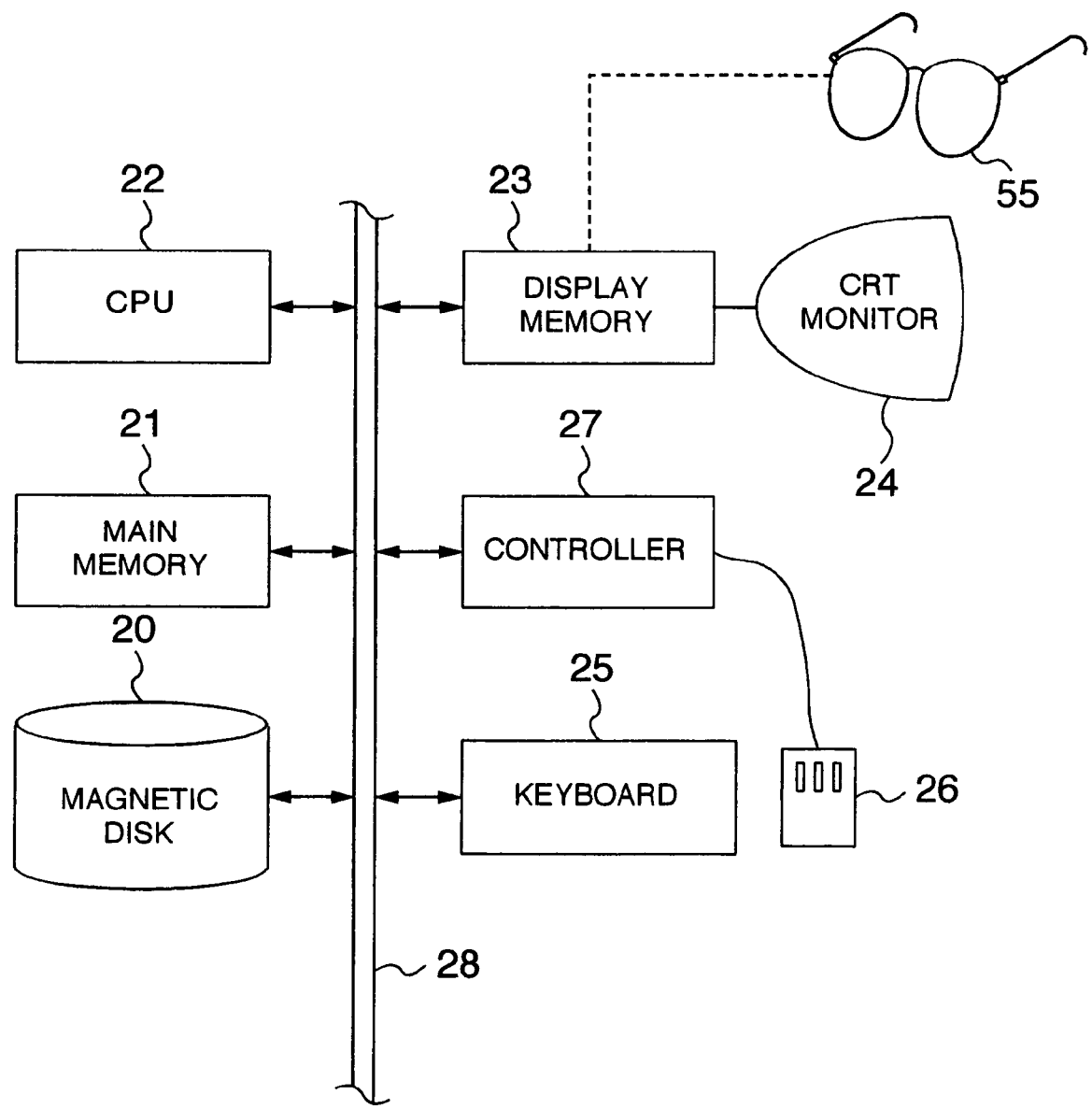
FIG. 20 is a block diagram showing an embodiment of the projection image forming and displaying apparatus according to the present invention.
Figure 21:
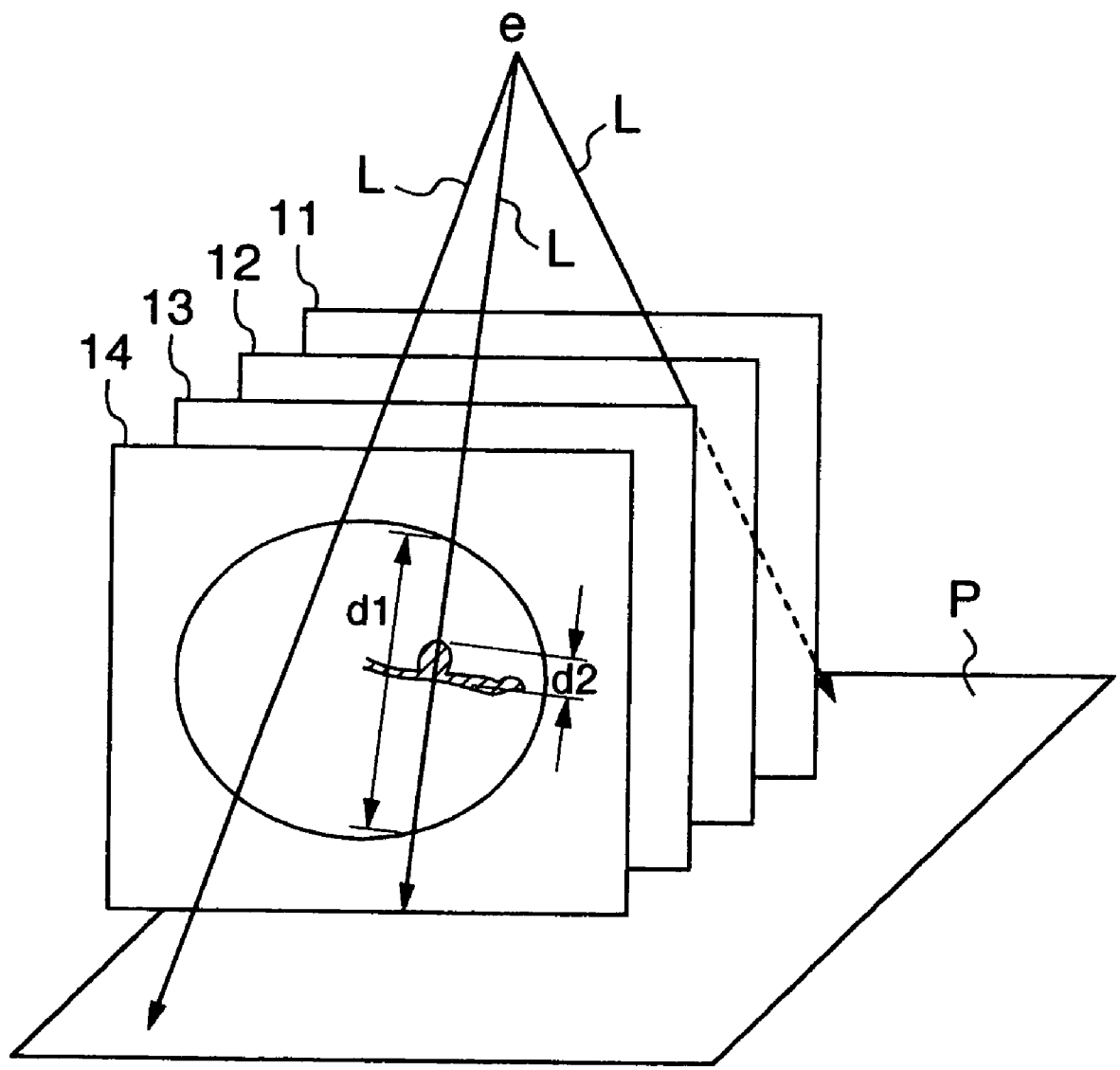
FIG. 21 is an explanatory view of a method according to the background art.

Further, in the embodiments shown in FIGS. 1 and 4, the case of one view point e has been described. Alternatively, a pair of view points e may be set in positions at a predetermined distance from each other so that two projection images having parallax can be formed and displayed so as to be observed stereoscopically when the process shown in FIGS. 2A, 3 and 5 is applied to the pair of view points. For example, as shown in FIG. 20, two projection images are displayed alternately in one and the same display portion with a repetition frequency of 30 Hz and the observer puts liquid crystal shutter spectacles 55. The spectacles are designed so that the left and right eyes can be opened alternately in synchronism with the vertical synchronizing signal of the CRT monitor 24.

A specific pixel value may be written in a required portion of a required CT image 1 or in required portions of a plurality of CT images 1 or all CT images 1 in advance. The specific pixel value may be processed on the basis of the flow shown in FIG. 2A, 2B, 3 or 5 so that a projection image is formed and displayed. When, for example, a pixel value to be displayed with high density is written in the peripheral portion of a specific internal organ by the operation of the mouse and stored in the original CT image memory portion while a CT image 1 is read out to an image memory so as to be displayed on the monitor, the portion is displayed with high density regardless of the actual pixel value so that an effect of contour emphasis is obtained. Further, a plurality of projection images obtained on the basis of the CT images 1 processed in advance as described above may be displayed so as to be animated as will be described later.

In the embodiments shown in FIGS. 4 and 6, only positions corresponding to pixel positions having the mark "1" recorded on a required CT value marking bit memory MC may be displayed, for example, with color or high luminance or so as to be blinked when a projection image is displayed. By this measure, a required CT value portion in the projection image is displayed specifically so as to be distinguished from other CT value portions. Incidentally, the color displaying method herein will be described later. Further, the high-luminance displaying method is achieved when weighting to image data read-out from the required CT value marking bit memory MC is made large. Further, the blinking displaying method is achieved when the display and non-display of the output data of the required CT value marking bit memory are repeated at time intervals, for example, of 1 second.

Figure 10:
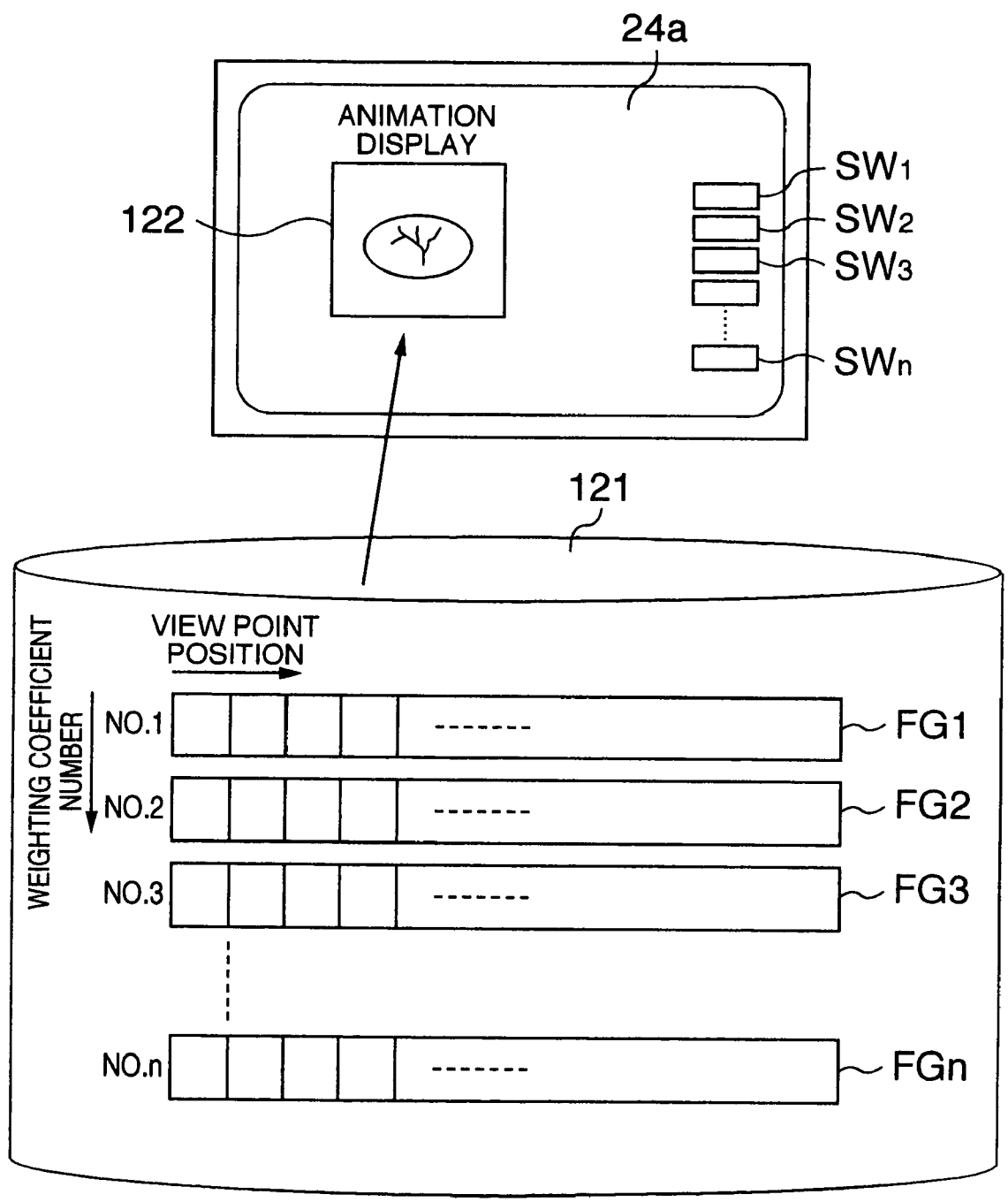
FIG. 10 is a view for explaining the operation theory for performing animation display by application of the present invention.

As shown in FIG. 10, different weighting coefficients No. 1 to No. n are provided and a plurality of projection image groups (image group FG1 to image group FGn) formed by changing the view point position and/or the view line direction by weighting coefficient, that is, by changing the view point position successively in a predetermined direction in FIG. 10, are stored in a storage medium 121. On the other hand, buttons SW1 to SWn for displaying the image groups FG1 to FGn respectively are displayed on the CRT monitor screen 24a. When one button SWk (k=1 to n) for displaying an image group FGk (k=1 to n) is clicked by a mouse (not shown), a plurality of projection images constituting the image group FGk of the weighting coefficient No. k (k=1 to n) are read out successively to the image memory so as to be displayed as an animated image 122 on the CRT monitor screen 24a. By this measure, it is possible to observe the projection image 122 as an animated image in which a portion, such as a bone portion, a soft tissue, a blood vessel, or the like, corresponding to the size of the weighting coefficient is emphasized.

As a specific example, on the assumption that a plurality of CT images 11 to 1n as original images are piled-up images of a human body's waist portion, it is now assumed that image groups FG1 and FG2 are formed with weighting coefficients to make the weighting of both the bone portion and the soft tissue large under the condition that the view point position is changed in a predetermined direction at intervals of a predetermined angle around the body axis thereof and that the view line direction is taken so as to be common to the directions of the axial centers (origin) of all CT images. In this case, when the button for displaying the image group FG1 is clicked by the mouse, a rotating image of the bone portion of the waist portion around the body axis as the center axis is displayed on the CRT monitor screen 24a. When the button for displaying the image group FG2 is clicked by the mouse, a rotating image of the soft tissue portion, such as flesh, skin, etc., of the waist portion around the body axis as the center axis is displayed on the CRT monitor screen 24a. This is effective for comparative diagnosis of the bone portion and the soft tissue portion in the waist portion. Incidentally, a plurality of animated images such as rotating images, or the like, may be displayed side by side on the CRT monitor screen 24a, that is, in the aforementioned example, rotating images of the bone portion and the soft tissue portion in the waist portion may be displayed side by side on the CRT monitor screen 24a. Further, the view line may be formed to be turned out of the origin so that the center axis of the rotating image can be moved (eccentrically) from the body axis. By this measure, when the center axis is placed near the portion to be diagnosed, vibration caused by the rotation of the portion can be reduced so that observation can be made easily.

When a plurality of images, such as a plurality of projection images obtained on the basis of different view line (projection line) directions or different view point positions, a combination of a projection image and a sectional image, a plurality of projection images obtained on the basis of different shapes of the weighting coefficient curve 72, etc., are displayed as in the two projection images 71a and 71b shown in FIG. 7A, as in the combination of the projection image 71a and the sectional image 26a shown in FIG. 7B or as in the three projection images 71c to 71e shown in FIG. 9, at least one displayed image can be displayed as an animated image by use of the embodiment of animation displaying shown in FIG. 10.

Figure 11:
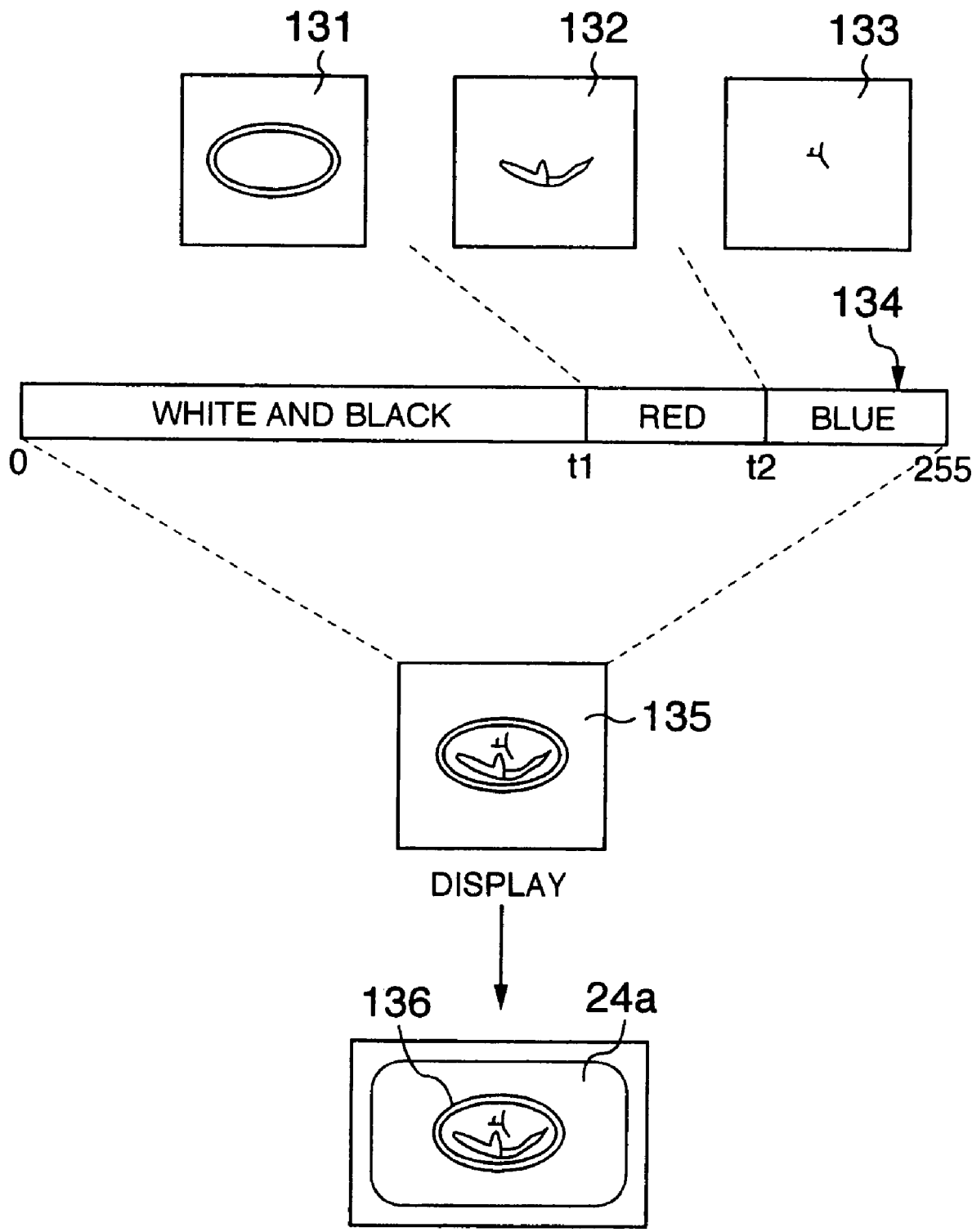
FIG. 11 is an explanatory view showing the theory of color display of a projection image obtained by the method of the present invention.

As shown in FIG. 11, for example, a projection image weighted only with a weighting coefficient for the soft tissue is stored in the memory 131, a projection image weighted only with a weighting coefficient for the bone portion is stored in the memory 132, and a projection image weighted only with a weighting coefficient for the blood vessel portion is stored in the memory 133.

Then, the projection images stored in the memories 131 to 133 are added and synthesized on the basis of the following color map 134. As shown in FIG. 11, the color map 134 has 256 gradations of from 0 to 255. Among the gradations, gradations 0 to t1 are set as white and black (monochrome), gradations (t1+1) to t2 are set as red, and gradations (t2+1) to 255 are set as blue. The value of the memory 131 is standardized within the range of from 0 to t1 in accordance with the density of each pixel, the value of the memory 132 is standardized within the range of from (t1+1) to t2 in accordance with the density of each pixel, the value of the memory 133 is standardized within the range of from (t2+1) to 255 in accordance with the density of each pixel, and those values are added to the memory 135. By this measure, a synthesized projection image 136 is obtained so that the soft tissue is displayed with monochrome light and shade, the bone portion is displayed with red light and shade, and the blood vessel portion is displayed with blue light and shade. Incidentally, in each color, the color becomes lighter as the gradation of the color approaches 0 in the 256 gradations, and the color becomes darker as the gradation of the color approaches 255.

Here, when projection image displaying (containing monochrome displaying) is performed, the displayed colors depend on the color map. Accordingly, the storage values (product sum results) of the display memory (product sum memory) MB are required to be distributed to a predetermined range, for example, of from 0 to 255. This is achieved when the storage values are multiplied by a predetermined constant. To save the processing time, only several lines in the display memory (product sum memory) MB are sampled. The average value thereof is calculated. This is estimated as the average value. This constant may be defined as follows:

average value constant=center value in the range
constant=center value in the range average value That is, when the gradation range is from 0 to 255, the center value of the range is 128. Assuming that the average value obtained by sampling is 200, then the constant in the aforementioned expression is 0.64. Accordingly, when the respective CT values of pixels are multiplied by 0.64, display gradations can be obtained. When the calculated display gradation of each pixel is out of the range of from 0 to 250, the pixel is set to the minimum value 0 or the maximum value 250.

Figure 12:
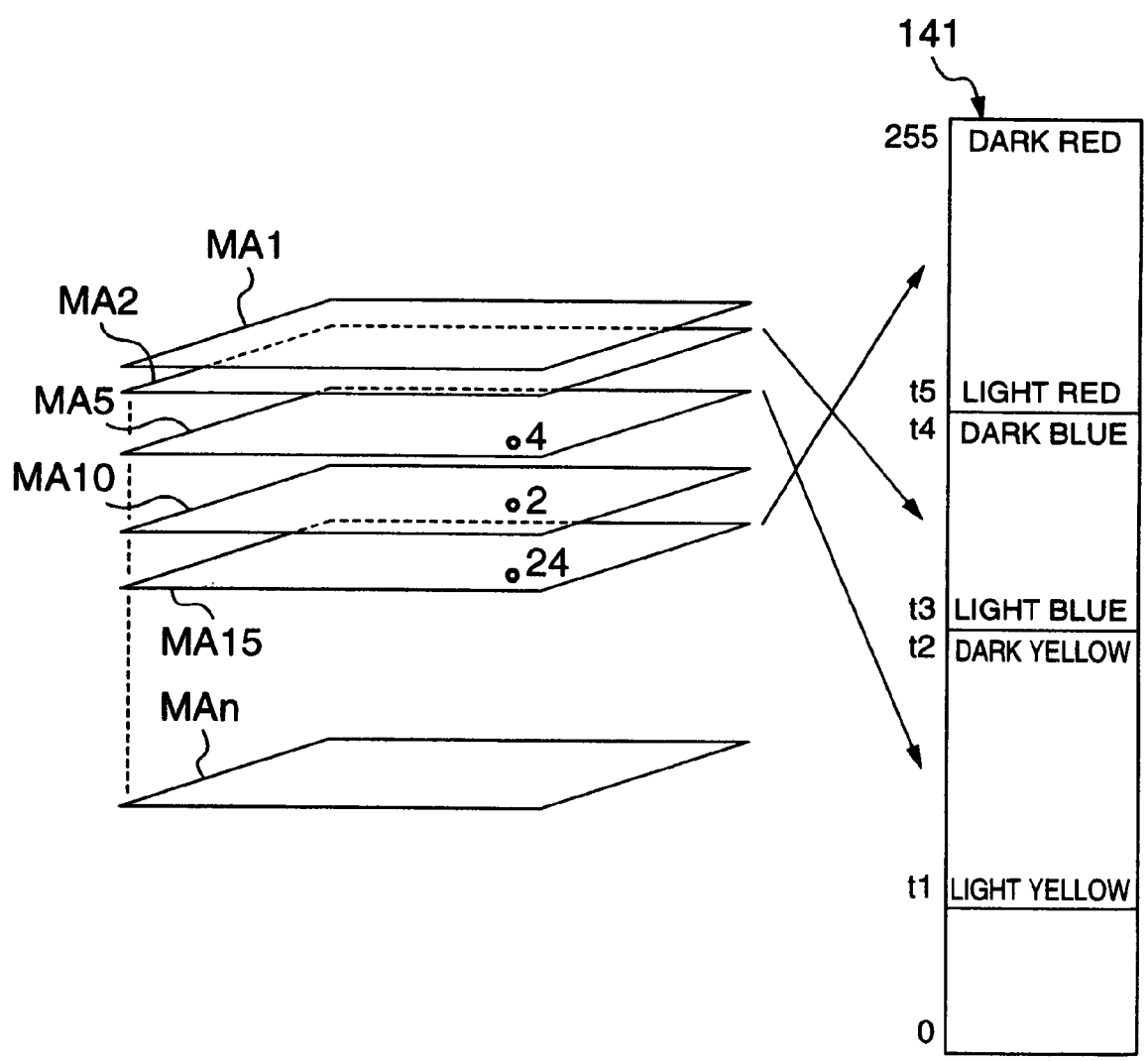
FIG. 12 is an explanatory view showing another example of color display of a projection image obtained by the method of the present invention.

The display of respective portions classified by color as shown in the synthesized projection image 136 in FIG. 11 can be performed without synthesizing based on addition as described above. That is, as shown in FIG. 12, the display of respective portions classified by color can be made if an image in a required CT value counting memory MA is displayed in accordance with a required color. For example, after the values in the fifth CT value counting memory MA5, the values in the second CT value counting memory MA2 and the values in the fifteenth CT value counting memory MA15 are standardized to the range of from t1 to t2 (yellow light and shade), the rang (red light and shade) respectively in accordance with the density of the respective pixels, all the values are ORed in a synthesizing memory (not shown) and results of ORing are displayed on the CRT monitor screen 24a.

By this measure, there is obtained a synthesized projection image (not shown) which is displayed so as to be classified by color by image in required CT value counting memories MA, that is, by color by portion. Incidentally, the color map 141 used herein has 256 gradations of from 0 to 255. In each color, the color becomes lighter as the gradation of the color approaches 0 in the 256 gradations, and the color becomes darker as the gradation of the color approaches 255.

Figure 13:
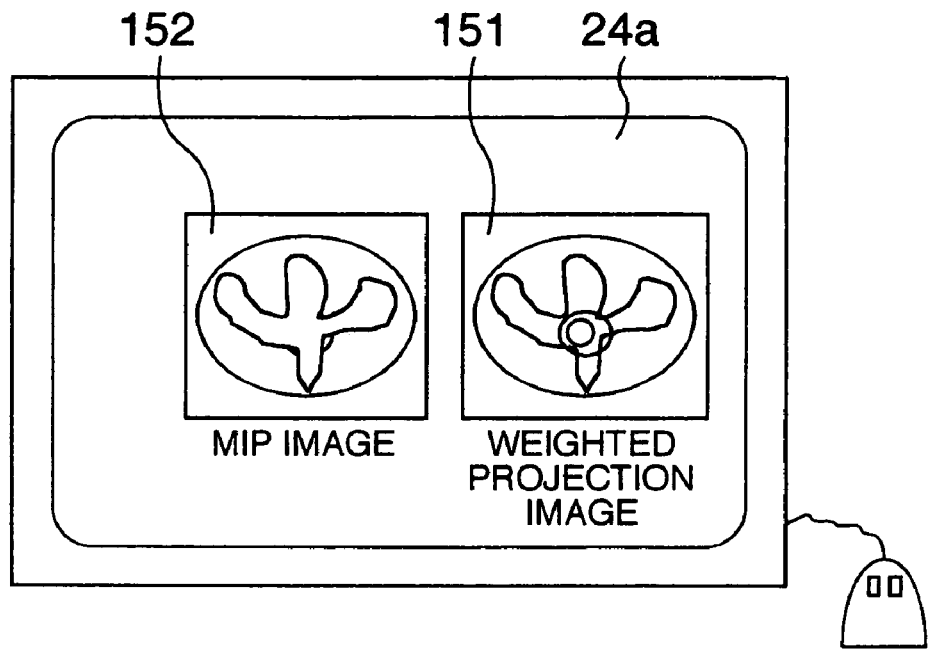
FIG. 13 is a view showing an example in which a projection image obtained by the method of the present invention and a projection image in the background art are monitor-displayed side by side.

As shown in FIG. 13, a projection image (weighted projection image) 151 obtained in the embodiment shown in FIG. 1 or 4 and an image (MIP image) 152 obtained from the same object as the object of the projection image 151 and in the same direction as the direction of the projection image 151, obtained from the same view point position and the same view line direction as possible and having the maximum value of the density taken by a conventional maximum value projection displaying method, or the like, may be displayed side by side on the CRT monitor screen 24a.

By this measure, the images can be observed and diagnosed by interpolative use of image information of the maximum value of the density on the projection line on the basis of the conventional MIP image 152 and image information based on the projection image 151 obtained by the method of the present invention and pertinent to the other required portions weighted.

Figure 14A:
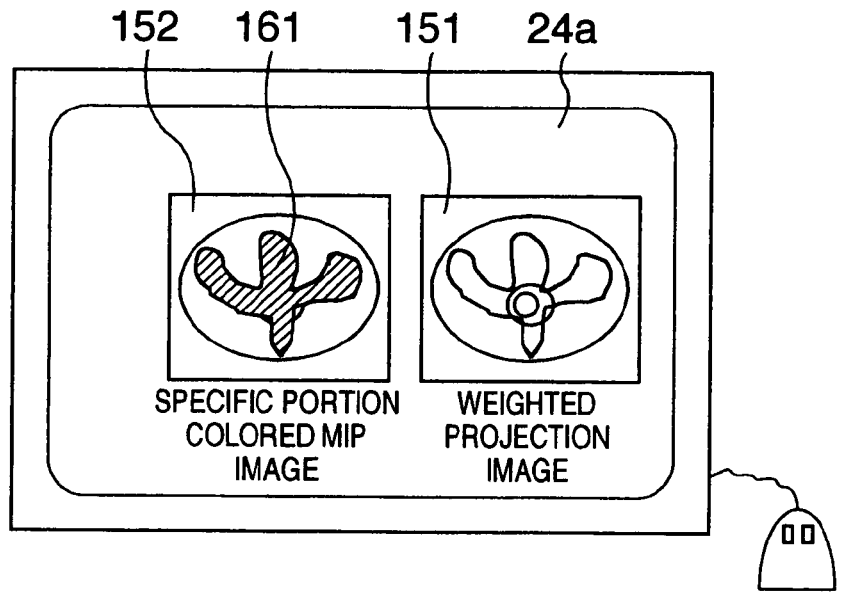
FIG. 14A is a view showing an example of monitor display in which the images shown in FIG. 13 are colored.
Figure 14B:
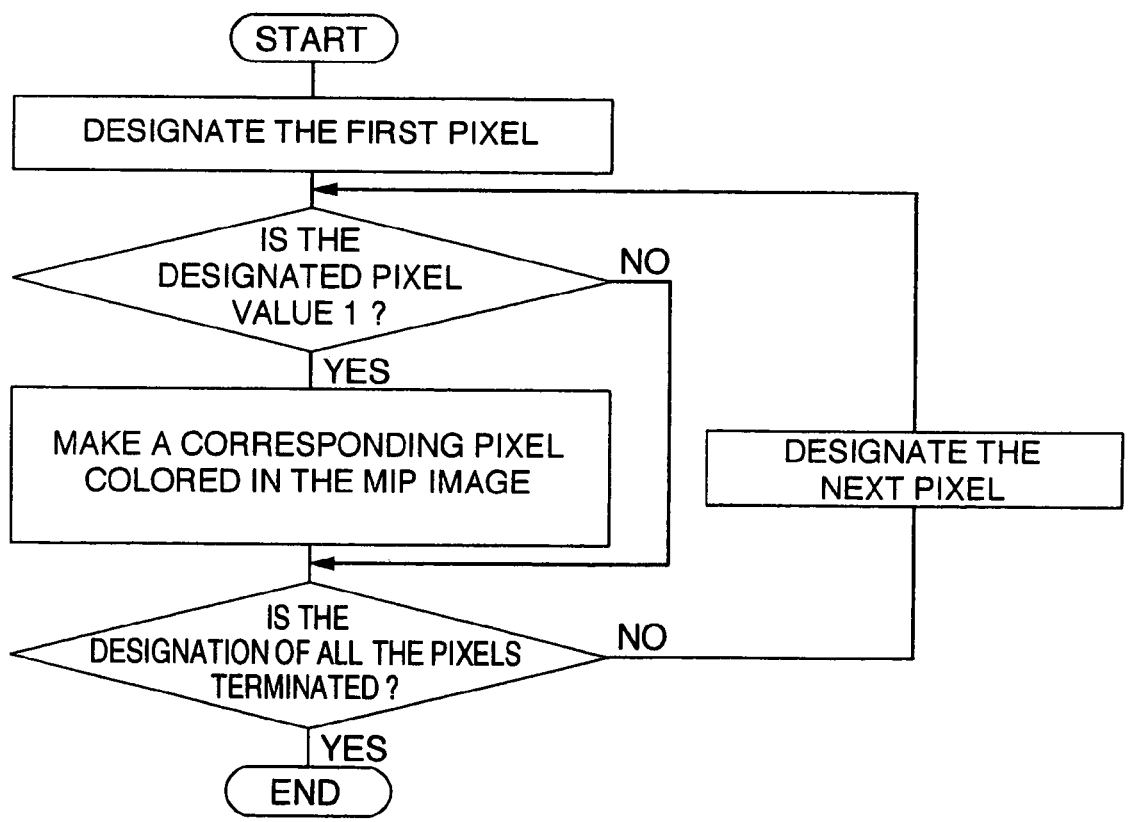
FIG. 14B is a flow chart showing an operation for obtaining a scene shown in FIG. 14A.

In FIG. 13, pixel positions on the MIP image, corresponding to pixel positions having a required CT value on the projection image 151 may be displayed with color. The positions to be displayed with color on the MIP image 152 are determined as follows. For example, the MIP image 152 is collated with a required CT value marking bit memory MC in the CT value marking bit memories MC shown in FIG. 4. As shown in the flow chart of FIG. 14B, while pixels on the MIP image 152 are scanned successively, the required CT value marking bit memory MC is referred to by the pixel positions. If the mark "1" is set in a corresponding pixel position in the memory MC, the pixel position on the MIP image 152 is colored. This is executed for all pixel positions on the KIP image 152. FIG. 14A is a view showing an example thereof. The hatched portion 161 in the MIP image 152 is a colored region having a required CT value. Incidentally, in FIG. 14A, parts the same as or equivalent to those in FIG. 13 are referenced correspondingly.

Thus, the required CT value portion in the MIP image 152 formed from only image information of the maximum value of the density on the projection line is displayed specifically so as to be distinguished from the other portions. If specific display can be made, color display may be replaced by high-luminance display or blinking display.

Figure 15:
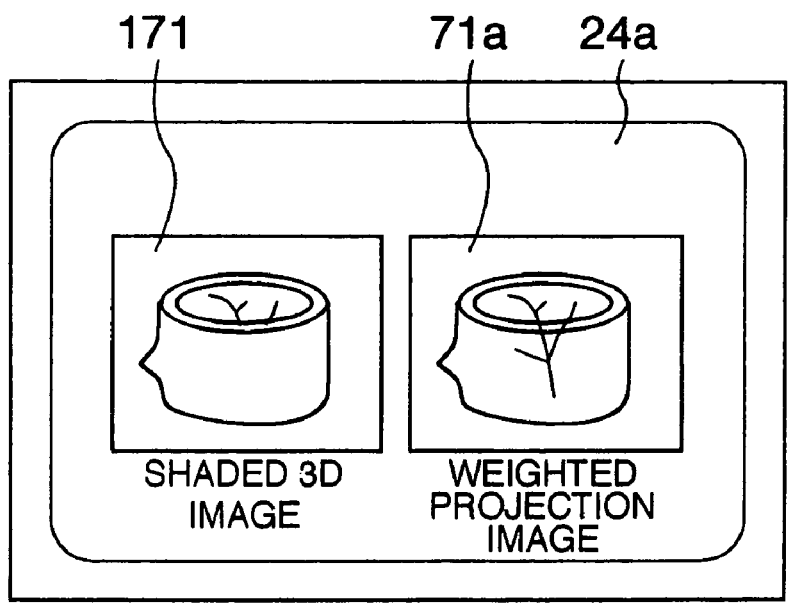
FIG. 15 is a view showing an example of monitor display of two kinds of projection images obtained by the method of the present invention.

Although FIG. 7B shows an example in which the weighted projection image 71a obtained by the method of the present invention and the CT image suitably selected from the plurality of CT images 11 to 1n as the origin of the projection image 71a are displayed side by side on the CRT monitor screen 24a, the projection image 71a and a three-dimensionally displayed image (hereinafter referred to as three-dimensional image) 171 may be displayed side by side as shown in FIG. 15. This three-dimensional image is reconstructed as a shaded three-dimensional image 171 by use of the plurality of CT images 11 to 1n. The configuration of such a three-dimensional image has been described in JP-A-8-16813. In this case, to set the view point position and the view line direction at the time of the formation of the three-dimensional image 171 in the same manner as those at the time of the formation of the projection image 71a is very effective for comparison and collation between the two images 71a and 171.

Figure 16A:
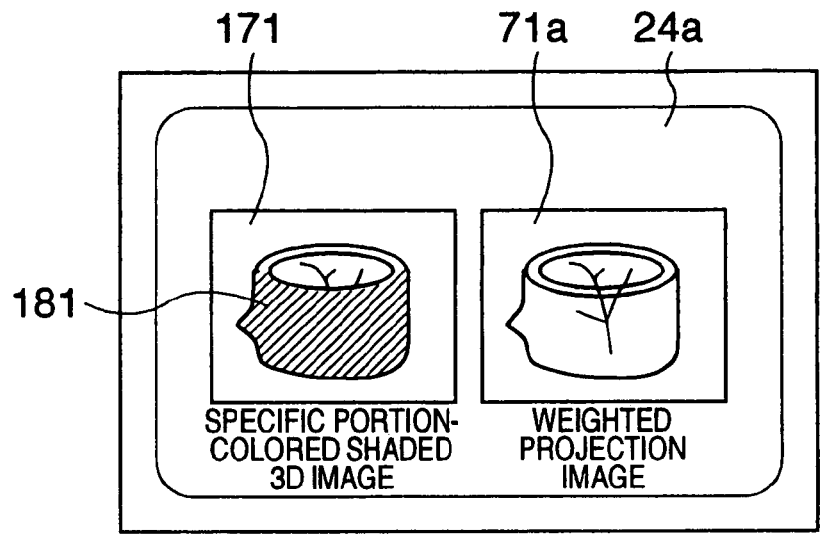
FIG. 16A is a view showing an example of monitor display in which one kind of the projection images shown in FIG. 15 is partially colored.
Figure 16B:
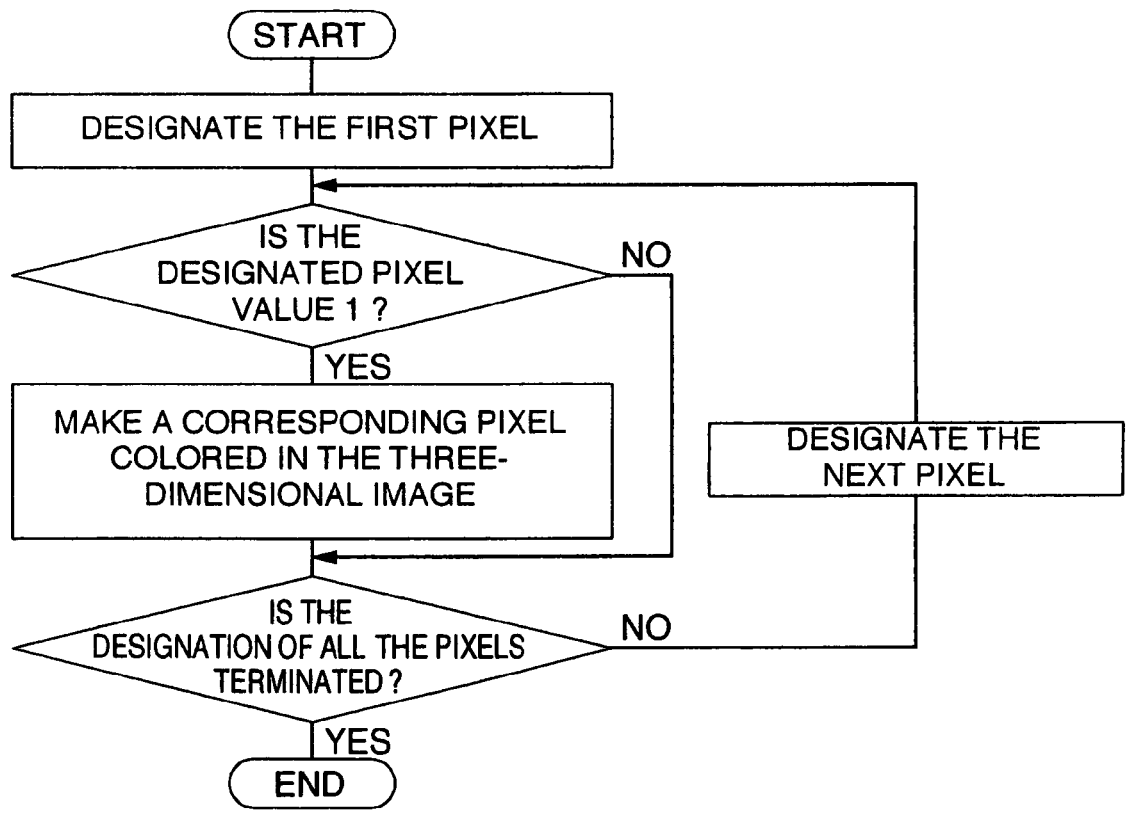
FIG. 16B is a flow chart showing a procedure for obtaining the projection image of FIG. 16A.

In FIG. 15, pixel positions on the three-dimensional image 171 corresponding to pixel positions having a required CT value on the projection image 71a may be displayed with color. The setting of a color-displayed position on the three-dimensional image 171 is performed in accordance with the flow chart shown in FIG. 16B. The three-dimensional image 171 is collated with a required CT value marking bit memory MC in the CT value marking bit memories MC shown in FIG. 4. If the mark "1" is set in a pixel position in the required CT value marking bit memory MC corresponding to a predetermined pixel position on the three-dimensional image 171, the pixel position on the three-dimensional image 171 is colored. This is executed for all pixel positions on the three-dimensional image 171. FIG. 16A is a view showing an embodiment of the flow chart for executing this. The hatched portion 181 in the three-dimensional image 171 is a colored region having a required CT value. Incidentally, in FIG. 16A, parts the same as or equivalent to those in FIG. 15 are referenced correspondingly.

By this measure, a required CT value portion in the three-dimensional image 171 is displayed specifically so as to be distinguished from the other portions. If specific displaying can be made, color displaying may be replaced by high-luminance displaying or blinking displaying.

Figure 17:
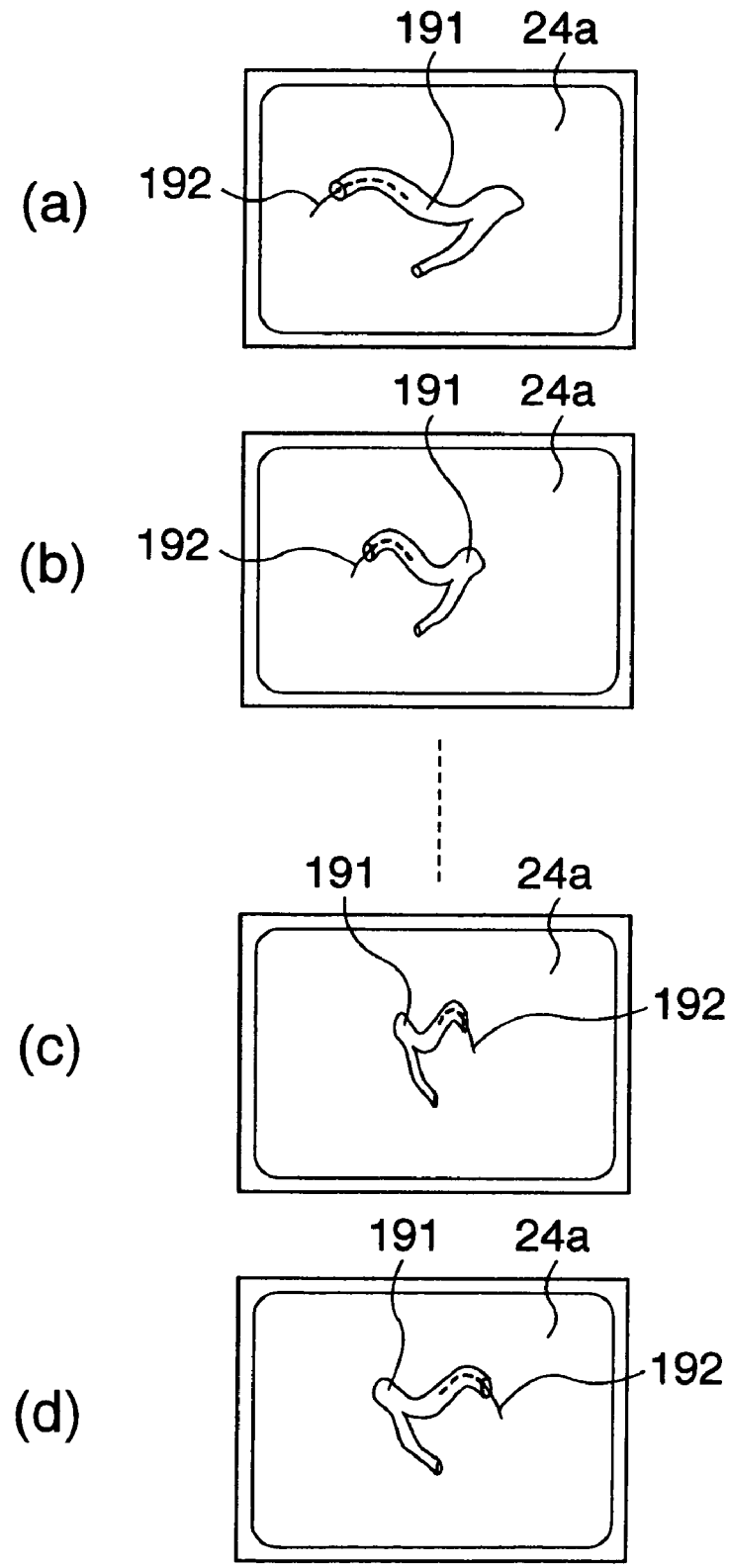
FIG. 17 is a view showing further examples of monitor display of a projection image obtained by the method of the present invention.

As shown in FIG. 17, when the weighted projection image to be displayed on the CRT monitor screen 24a is a blood vessel image 191 (generally, internal organ image) and a medical tool, such as a catheter, or the like, moved in a blood vessel is inserted in the blood vessel, an image 192 of the medical tool moved in the blood vessel may be synthesized with the blood vessel image 191 so as to be displayed on the CRT monitor screen 24a. Here, in addition to the synthesizing display, rotation of the synthesized image is made. Although FIG. 17 shows an example in which the synthesized image rotates around the vertical axis in order of (a), (b) . . . (c) and (d), the synthesized image may be designed so as to rotate around the horizontal axis. Further, an image rotating around the vertical axis and an image rotating around the horizontal axis may be displayed side by side or the two images may be displayed alternately. Incidentally, these displaying methods can be achieved by application of the embodiment described above with reference to FIG. 10.

Figure 18:
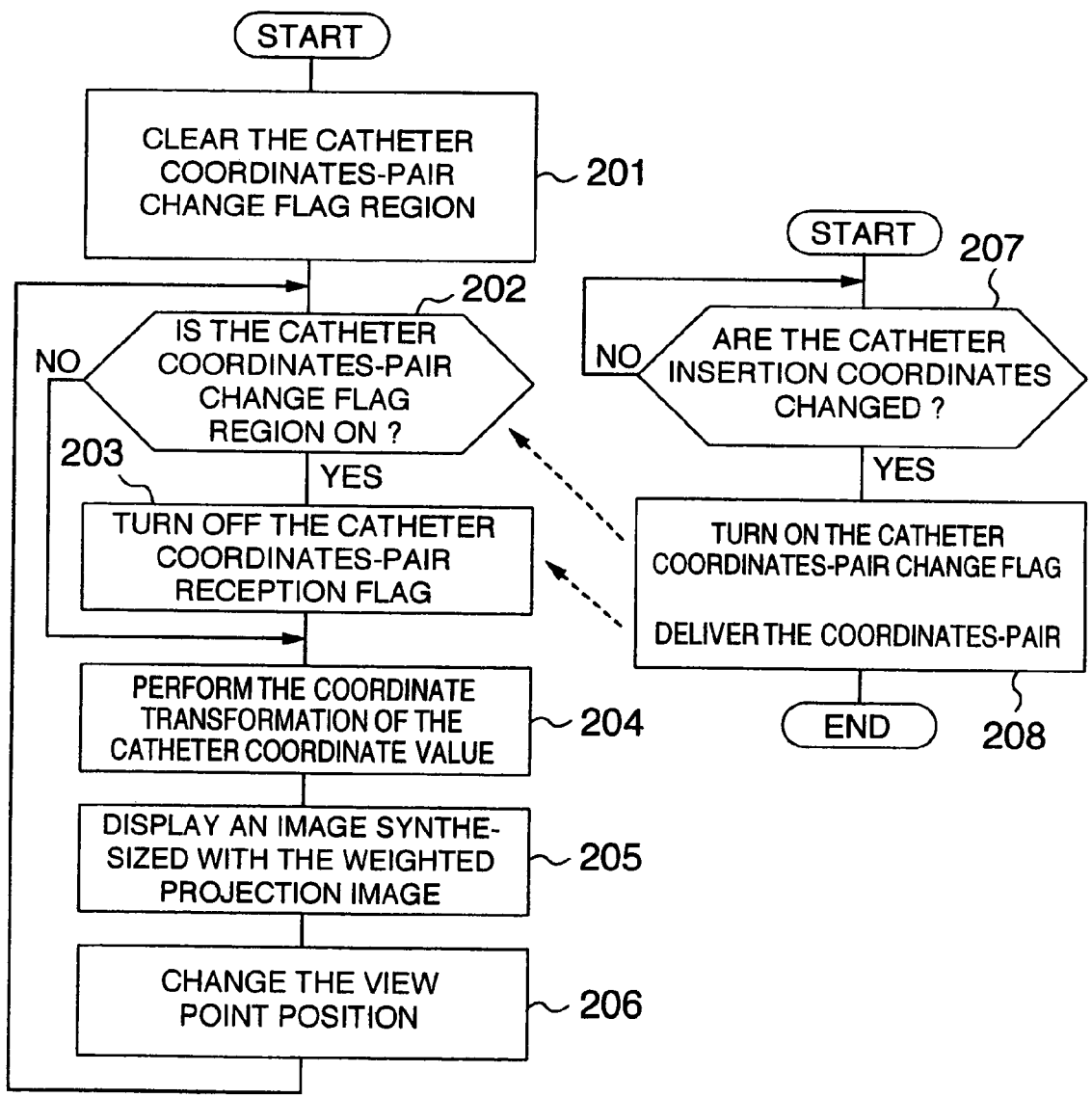
FIG. 18 is a flow chart showing an example of a procedure for monitor-displaying the projection image depicted in FIG. 17.

An example of such an image displaying procedure is shown in FIG. 18.

In step 201, a flag region indicating change of the pair of coordinates of an image of a medical tool moved in the blood vessel, that is, in this example, of a catheter image 192 is cleared.

In step 202, a judgment is made as to whether the flag indicating change of the pair of coordinates of the catheter is on or not. If the flag is on, the situation of the process goes to step 203. Otherwise, the situation of the process skips to step 204.

In step 203, the pair of coordinates of the catheter are received from a catheter-coordinates detection means (not shown) and the catheter coordinate-pair change flag is turned off.

In step 204, the received pair of coordinates of the catheter is transformed into corresponding pair of coordinates in a coordinate system of the blood vessel image 191.

In step 205, the catheter image 192 subjected to the coordinates-pair transformation is synthesized with the blood vessel image 191 and displayed.

In step 206, the view point position for the blood vessel image 191 is changed to a position advanced around a predetermined rotation axis by a predetermined angle in a predetermined direction.

Thereafter, the steps 202 to 206 are repeated. As shown in FIGS. 17(a) to 17(d), a rotating synthesized image (blood vessel image 191 and catheter image 192) is displayed on the CRT monitor screen 24a.

Incidentally, steps 207 and 208 show a flow on the catheter-coordinates detection means side. In step 207, a judgment is made as to whether the coordinates of insertion of the catheter are changed or not. If the coordinates are changed, the situation of the process goes to step 208. Otherwise, the step 207 is repeated.

In step 208, the flag indicating change of the pair of coordinates of the catheter image 192 is turned on and the pair of coordinates are taken in the step 203.

The synthesizing display of the blood vessel 191 and the catheter image 192 is useful for insertion of the medical tool, such as a catheter, or the like, moved in the blood vessel.

Figure 19:
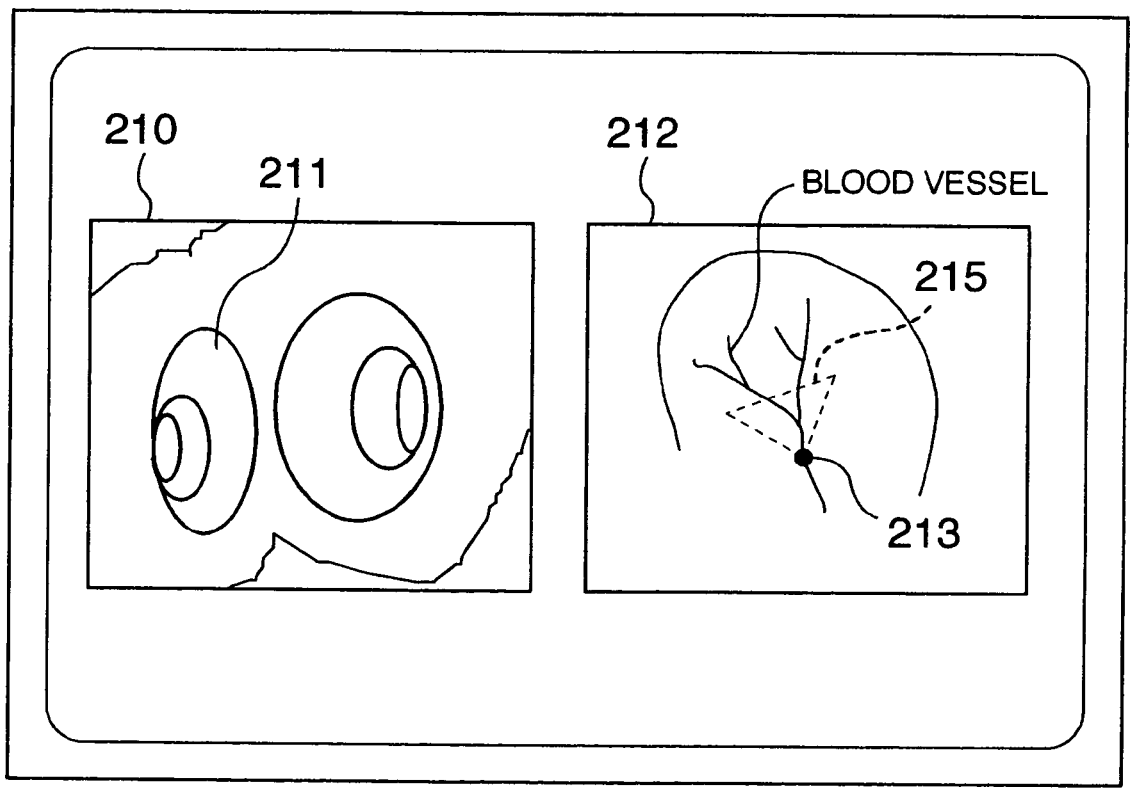
FIG. 19 is a view showing an example of monitor display in which a portion of object to be examined of the projection image obtained by the method of the present invention is specified.

FIG. 19 is a view showing an applied example of the present invention. An inner surface 211 of a blood vessel is displayed in an image 210. This scene 210 is, however, generally indistinct as to what portion is observed in an overall image 212. Therefore, a view point 213, a view field and a projection plane 215 as related to execution of the present invention are displayed in the image 212 in the form of a triangle or pyramid (not shown) as represented by the broken line in order to obtain the image 210. By the display of the view point, view field and projection plane, it is possible to recognize that, with respect to the image 210 seen as a projection image, the projection image is which part of the image 212 on which plane when the part is seen in which direction.

Incidentally, the method for displaying a view point, a view field and a projection plane on a scene and the method for reconstructing and displaying a projection image of a portion designated by the above method have been disclosed in JP-A-8-16813.

Although the above description has been made about X-ray CT images, the present invention is not limited thereto but may be applied also to MRI sectional images, a three-dimensional MRI volume image or ultrasonic tomographic images. Incidentally, in MRI images or ultrasonic images, density values are used as pixel values corresponding to CT values.

FIG. 20 is a block diagram showing an embodiment of the schematic configuration of a projection image forming and displaying apparatus according to the present invention. In FIG. 20, the reference numeral 20 designates a magnetic disk; 21, a main memory; 22, a CPU (central processing unit); 23, a display memory; 24, a CRT monitor; 25, a keyboard; 26, a mouse; 27, a mouse controller; and 28, a common bus.

In this case, the magnetic disk 20 is provided for storing a plurality of sectional images or volume images such as CT images, or the like, as a subject of formation, programs for execution of the aforementioned counting process or marking recording process, the weighting process, the pixel position coordinate transformation, etc., operation programs, weighting coefficient curves, etc. The magnetic disk 20 further stores various kinds of data, such as projection images after formation, etc., obtained by execution of various kinds of programs. The main memory 21 is provided for storing various kinds of programs and data temporarily at the time of execution of programs. Incidentally, the magnetic disk may be replaced by an optical disk. The CPU 22 performs arithmetic operations necessary for execution of programs, processing and controlling of respective parts of the apparatus.

The display memory 23 stores data such as CT images, projection images, weighting coefficient curves, etc., data for displaying the mouse cursor, etc. The CRT monitor 24 displays, as an image, the data stored in the display memory 23. That is, with the execution of various kinds of programs, a CT image, a projection image, a weighting coefficient curve, a mouse cursor, etc. are displayed on the CRT monitor 24.

The keyboard 25 is provided for inputting various kinds of operating instructions, data, etc. For example, the mouse 26 is used for inputting positions of a view point, a projection plane, a sectional image, etc., selection and correction of a view line (projection line) direction and a weighting coefficient curve, and so on. The mouse controller 27 controls the mouse 26. The common bus 28 is provided for connecting the aforementioned respective parts of the apparatus. Incidentally, the liquid crystal shutter spectacles 55 are provided for shading the left and right liquid crystals of the spectacles alternately in synchronism with the vertical synchronizing signal of the CRT monitor 24 so that two identical object images different in view point are displayed alternately so as to be observed as a solid image.

In the above configuration, the CPU 22 computes and executes the processing flow shown in FIGS. 2A, 3 and 5 through the operation of the keyboard 25 or the mouse 26, so that a projection image is formed and displayed.

INDUSTRIAL APPLICABILITY

As described above, the method and apparatus for forming and displaying a projection image from a plurality of sectional images according to the present invention is useful for application to X-ray, MRI and ultrasonic image processing apparatuses and methods.

What is claimed is:

1. A method for setting a view point in a predetermined position with respect to a virtual three-dimensional image of an object to be examined formed by stack of a plurality of sectional images or formed from at least one volume image and setting projection plane for projecting said virtual three-dimensional image from said view point so that said virtual three-dimensional image from said view point is projected onto said projection plane to thereby form and display a projection image, said method comprising:

a reading step of reading out pixel values at intervals of a predetermined distance on a projection line with respect to said virtual three-dimensional image crossed by said projection line which goes from said view point toward said projection plane;

a recording step in which with respect to a plurality of pixel value memories provided respectively corresponding to a plurality of predetermined values different from each other and provided with recording regions for respectively recording pixels constituting an image, when the read-out pixel value fits to one of said predetermined values, the pixel data are recorded in the pixel recording region corresponding to the fitted predetermined value; and a displaying step of reading out said pixel data stored in said pixel value memory and displaying said pixel data as a projection image on a display unit.

2. A method according to claim 1, wherein said displaying step includes:

a weighting step of weighting pixel data read out from a plurality of ones of said pixel value memories by giving predetermined weighting coefficients to said pixel data by said pixel value memory;

a synthesizing step of synthesizing data on the basis of said weighted pixel data from said plurality of pixel value memories by an identical pixel; and a displaying step of displaying said synthesized data.

3. A method according to claim 2, wherein said weighting step is carried out so that a larger weighting coefficient is given to pixel data read out from a pixel value memory corresponding to a pixel value to be emphasized.

4. A method according to claim 2, wherein said weighting coefficient given to pixel data from a pixel value memory corresponding to a pixel value to be not displayed on said display unit is set to zero.

5. A method according to claim 2, wherein said weighting step includes:

a preparing step of preparing in advance a plurality of weighting coefficient curves in which weighting coefficients are set to be different from each other by said pixel value;

a displaying step of displaying a plurality of selection buttons corresponding to said plurality of weighting coefficient curves; and an applying step of applying a weighting coefficient curve corresponding to one of said plurality of selection buttons to pixel data from said pixel value memory when said selection button is selected from said plurality of selection buttons.

6. A method according to claim 5, further comprising a step of changing the characteristic of said weighting coefficient curve displayed on said display unit.

7. A method according to claim 5, wherein both said projection image and said selected weighting coefficient curve are displayed on said display unit.

8. A method according to claim 7, wherein when the characteristic of said weighting coefficient curve displayed is changed, a projection image which is weighted in accordance with the changed weighting coefficient curve is displayed on said display unit.

9. A method according to claim 5, wherein a corresponding pixel value is displayed on a coordinate axis which expresses a pixel value on said weighting coefficient curve displayed on said display unit.

10. A method according to claim 5, wherein the name of a portion of object to be examined corresponding to a pixel value is displayed in a position corresponding to said pixel value on a coordinate axis which expresses a pixel value on said weighting coefficient curve displayed on said display unit.

11. A method according to claim 1, further comprising a step of allocating a plurality of pixel value memories as a group among said pixel value memories to one memory region.

12. A method according to claim 1, wherein said displaying step is carried out so that pixel data read out from one of said plurality of pixel value memories are displayed.

13. A method according to claim 1, wherein said displaying step includes: a step of preparing in advance a plurality of weighting coefficient characteristics in which weighting coefficients different from each other by said pixel value are set; a step of forming a plurality of projection images corresponding to said plurality of weighting coefficient characteristics; and a step of displaying said plurality of thus formed projection images on said display unit.

14. A method according to claim 1, wherein said recording step includes a process of adding said predetermined value to said pixel recording region whenever said fitting occurs.

15. A method according to claim 14, wherein said displaying step is carried out so that said projection image is shaded in accordance with the size of pixel data recorded in said pixel value memory.

16. A method according to claim 1, wherein said view point is located at an infinite far point so that parallel projection is performed.

17. A method according to claim 1, wherein said reading step is carried out so that, when said virtual three-dimensional image is formed by stack of a plurality of sectional images, pixel value reading-out is executed by a point at which said projection line passes through each of said sectional images.

18. A method according to claim 1, wherein said reading step is carried out so that, when there is no pixel value in a pixel position to be read out, a pixel value which is obtained by executing interpolation on the pixel in said position is used as a read-out value.

19. A method according to claim 1, wherein, only when a pixel value read in said reading step is fitted to a predetermined threshold condition, said recording step is processed on said pixel value fitted to said threshold condition.

20. A method according to claim 1, wherein a predetermined range is given as said predetermined value in said recording step so that said fitting to execute said recording occurs when said read-out pixel value is contained in said range.

21. A method according to claim 1, wherein said displaying step is carried out so that a plurality of images are displayed.

22. A method according to claim 21, wherein said displaying step includes:

recording a first projection image formed under a first condition in a first predetermined address region designated in advance in a display memory;

recording a second projection image formed under a second condition in a second address region designated in advance in said display memory; and displaying those image data recorded in said display memory on said display unit.

23. A method according to claim 22, wherein said first and second conditions are different from each other in said view point or in said projection plane.

24. A method according to claim 23, wherein virtual existing positions of said view point and said projection plane with respect to said first projection image formed under said first condition are displayed on said second projection image.

25. A method according to claim 22, wherein said first and second conditions are different from each other in weighting coefficient.

26. A method according to claim 25, wherein said first and second coefficients being different from each other in weighting coefficient causes said first projection image to be displayed more emphatically than said second projection image in said displaying step.

27. A method according to claim 22, wherein said first and second conditions are different from each other in pixel value memory.

28. A method according to claim 21, wherein said displaying step includes:

recording first image data read out from said pixel value memory in a first predetermined address region designated in advance in a display memory;

recording second image data different from said image data in a second address region designated in advance in said display memory; and displaying those image data recorded in said display memory on said display unit.

29. A method according to claim 28, wherein said second image data are image data formed by a maximum value projecting method.

30. A method according to claim 28, wherein said second image data are formed from predetermined one of said plurality of sectional images.

31. A method according to claim 21, wherein said displaying step includes:

receiving information pertinent to the movement of a medical tool which moves in said object to be examined;

recording said projection image in a display memory; and recording image data of said medical tool based on said information pertinent to the movement thereof in said display memory in order to synthesize said image data with said projection image.

32. A method according to claim 31, wherein said projection images to be subjected to said synthesizing are formed from image data read out from a pixel value memory with respect to a pixel value pertinent to a blood vessel in which said medical tool is to be inserted.

33. A method according to claim 1, wherein said displaying step includes:
   recording, in a first display memory, a first projection image formed at a first view point;
   recording, in a second display memory, a second projection image formed at a second view point moved by a distance corresponding to parallax from said first view point;
   displaying said first and second projection images alternately on said display unit; and
   making said projection images stereoscopic so that said projection images displayed on said display unit are observed alternately by the left and right eyes of an observer in synchronism with said alternate displaying.

34. A method according to claim 1, wherein pixel data in a pixel value memory corresponding to a pixel value pertinent to a required observed portion are displayed intermittently on said display unit so that said portion of object to be examined is displayed so as to be blinked.

35. A method according to claim 1, wherein said displaying step further includes:
   preparing a color map in which a plurality of colors containing white and black are classified in accordance pixel value ranges to be allocated to classes of said color map;
   standardizing each pixel value range to a corresponding class of said color map; and
   synthesizing a projection image from pixel data thus standardized.

36. A method according to claim 2, further comprising:
   a condition change step of successively changing a condition containing at least one of said view point, said projection plane, and said weighting coefficient given to pixel data read out from said pixel value memory;
   an image processing step of performing image processing by executing a process from said reading step to said executing step whenever said condition is changed; and
   a projection image group forming step of forming a group of projection images by recording pixel data, which are obtained as a result of said image processing in said pixel value memory, as projection images in a plurality of recording regions successively;
   wherein said displaying step is carried out so that projection images stored in said plurality of storage regions are read out successively so as to be displayed as an animated image on said display unit.

37. A method according to claim 36, wherein said condition changing step is carried out so that said view point is rotated around a required center axis of said observed object and said projection images are displayed as a rotating image of said observed object in said displaying step.

38. A method according to claim 36, wherein said condition changing step includes:
   a first condition changing step of changing said view point successively;
   a second condition changing step of changing said weighting coefficient successively;
   a first condition changing executing step of executing both said image processing step and said projection image group forming step in accordance with said first condition changing step; and
   a second condition changing executing step of executing said first condition changing executing step whenever said second condition is changed in said second condition changing step;
   whereby a plurality of groups of projection images are formed.

39. A method according to claim 1, further comprising an executing step for making said projection line scan by pixel on said projection plan and for executing said reading step and said recording step every time a scanned pixel comes during the scanning.

40. A method according to claim 1, wherein said virtual three-dimensional image is formed by one of (1) a plurality of CT images from an X-ray CT system, (2) a plurality of MRI images from an MRI system, (3) a plurality of sectional images from an ultrasonic tomograph system, and (4) a solid image in a solid region having a required thickness.

41. A method according to claim 1, wherein said projection image includes at least a first projection image of a first organ or region and a second projection image of a second organ or region, and
   said first projection image is displayed more emphatically than said second projection image.

42. A method according to claim 41, wherein said emphatic displaying is performed by giving different weighting coefficients to said first projection image and said second projection image respectively.

43. A method according to claim 41, wherein said emphatic displaying is performed by making luminance different between said first projection image and said second projection image.

44. A method according to claim 41, wherein said emphatic displaying is performed by making density different between said first projection image and said second projection image.

45. A method according to claim 41, wherein said emphatic displaying is performed by making gradation different between said first projection image and said second projection image.

46. A method according to claim 41, further comprising a step of displaying information indicating degree of the emphasis adjacently to the emphasized projection image.

47. A method according to claim 41, further comprising a step of displaying a not-emphasized projection image and an emphasized projection image or a plurality of differently emphasized projection images adjacently to each other.

48. A method according to claim 1, further comprising:
   displaying a projection image and a distribution curve of weighting for CT values in said projection image;
   setting the weighting for a CT value on said distribution curve displayed to a required value; and
   displaying by highlighting said CT value weighted.

49. A method according to claim 1, further comprising:
   displaying a projection image;
   setting a required sectional image of said projection image displayed; and
   displaying by highlighting said required sectional image.

50. A method for setting a view point in a predetermined position with respect to a virtual three-dimensional image of an object to be examined formed by a stack of a plurality of sectional images or formed from at least one volume image and setting a projection plane for projecting said virtual three-dimensional image from said view point so that said virtual three-dimensional image is projected from said view point onto said projection plane to thereby form and display a projection image, said method comprising:

a reading step of reading out pixel values at intervals of a predetermined distance on a projection line with respect to said virtual three-dimensional image crossed by said projection line which goes from said view point toward said projection plane;

a recording step in which with respect to at least one pixel value memory provided corresponding to a predetermined value and provided with recording regions for respectively recording pixels constituting an image, only when the read-out pixel value first fits to said predetermined value, the pixel data are recorded in the pixel recording region corresponding to the fitted predetermined value; and a displaying step of reading out said pixel data stored in said pixel value memory and displaying said pixel value data as a projection image on a display unit.

51. A method according to claim 16, wherein said recording step includes: a step of calculating and recording the distance from said view point to the position where said pixel value read out by said reading step is present.

52. A method according to claim 51, wherein said displaying step is carried out so that said projection image is displayed while shaded so that the brightness thereof is changed in accordance with the size of said distance.

53. A recording medium which can be read by a computer and which has a program for executing:
   a function for setting both a view point and a projection plane;
   a function for reading out pixel values at intervals of a predetermined distance on a projection line with respect to a virtual three-dimensional image crossed by said projection line which goes from said view point toward said projection plane;
   a function in which, with respect to a plurality of pixel value memories provided respectively corresponding to a plurality of predetermined values different from each other and provided with recording regions for respectively recording pixels constituting an image, when the read-out pixel value fits to one of said predetermined values, the pixel data are recorded in the pixel recording region corresponding to the fitted predetermined value; and
   a function for reading pixel data recorded in said pixel value memory to form a projection image;
   said program being recorded in said recording medium so that a virtual three-dimensional image of an object to be examined formed by stack of a plurality of sectional images or formed of at least one volume image is projected from said view point onto said projection plane to thereby form a projection image.

54. A recording medium according to claim 53, further comprising an executing function for making said projection line scan by pixel on said projection plan and for executing said reading function and said recording function every time a scanned pixel comes during the scanning.

55. An apparatus for setting a view point in a predetermined position with respect to a virtual three-dimensional image of an object to be examined formed by stack of a plurality of sectional images or formed from at least one volume image and setting a projection plane for projecting said virtual three-dimensional image from said view point is set so that said virtual three-dimensional image is projected onto said projection plane from said view point to thereby form and display a projection image, comprising:
   reading means for reading out pixel values at intervals of a predetermined distance on a projection line with respect to said virtual three-dimensional image crossed by said projection line which goes from said view point toward said projection plane;
   a plurality of pixel value memories which are provided so as to respectively correspond to a plurality of predetermined values different from each other and which are provided with recording regions for recording pixels constituting an image;
   recording means in which said recording means records pixel data, when the pixel value read out by said reading means is fitted to one of said predetermined values, in a pixel recording region corresponding to said fitted predetermined value;
   pixel data reading means for reading out pixel data recorded in said pixel value memory; and
   a display unit for displaying, as a projection image, pixel data read out by said pixel data reading means.

56. An apparatus according to claim 55, wherein said pixel value memory is a pixel value counting memory in which said predetermined value is added whenever said fitting occurs.

57. An apparatus according to claim 55, wherein said pixel value memory is a pixel value marking bit memory in which said recording is executed when said fitting occurs first but said recording is not executed when said fitting occurs after that.

58. An apparatus according to claim 42, further comprising a distance memory for recording the distance from said view point to the existing position of said pixel value when said recording is executed.

59. An apparatus according to claim 58, wherein said display unit is designed so that said projection image is displayed on said display unit while the brightness thereof is changed in accordance with the distance recorded in said distance memory.

60. An apparatus according to claim 55, wherein said pixel data reading means includes a display memory for recording said read-out pixel data.

61. An apparatus according to claim 60, wherein: a plurality of said pixel value memories are provided; and said pixel data reading means includes addition means for adding pixel data recorded in corresponding pixel recording regions in selected ones of said plurality of pixel value memories; pixel data memory for recording pixel data added by said addition means; and means for recording the added pixel data in said pixel data memory, into a corresponding pixel recording region of said display memory.

62. An apparatus according to claim 61, wherein said addition means further applies required weighting to each of said pixel value memories, so that each of said pixel data read out from said pixel value memories is multiplied by a weighting coefficient corresponding to the degree of said weighting.

63. An apparatus according to claim 55, further comprising executing means for making said projection line scan all pixels on said projection plane and for operating said reading means and said recording means each time a pixel is scanned.

64. An apparatus according to claim 55, wherein:
   said projection image includes at least a first projection image of a first organ or region and a second projection image of a second organ or region, said first and second projection images being recorded in memories different from each other, and
   said image processing means forms emphasized projection images in which said first projection image is more emphasized than said second projection image, and said displaying means displays said emphasized projection images.

65. An apparatus according to claim 64, wherein said image processing means gives different weighting coefficients to said first projection image and said second projection image respectively.

66. An apparatus according to claim 64, wherein said image processing means forms emphasized projection images of said first and second projection images which are emphasized in luminance, and said displaying means displays said luminance-emphasized projection images.

67. An apparatus according to claim 64, wherein said image processing means forms emphasized projection images of said first and second projection images which are emphasized in density, and said displaying means displays said density-emphasized projection images.

68. An apparatus according to claim 64, wherein said image processing means forms emphasized projection images of said first and second projection images which are emphasized in gradation, and said displaying means displays said gradation-emphasized projection images.

69. An apparatus according to claim 64, wherein said displaying means displays information indicating degree of the emphasis adjacently to the emphasized projection image.

70. An apparatus according to claim 64, wherein said displaying means displays a not-emphasized projection image and an emphasized projection image or a plurality of differently emphasized projection images adjacently to each other.

71. An apparatus according to claim 55,
wherein said display unit displays a projection image and a distribution curve of weighting for CT values in said projection image, and further comprising:
means for setting the weighting for a CT value on said distribution curve displayed to a required value; and
means for displaying by highlighting said CT value weighted.

72. An apparatus according to claim 55, further comprising means for setting a required sectional image of said projection image displayed, wherein said display unit enables display by highlighting said required sectional image.

73. A recording medium which can be read by a computer and which has a program for executing:
a function for setting both a view point and a projection plane;
a function for reading out pixel values at intervals of a predetermined distance on a projection line with respect to a virtual three-dimensional image crossed by said projection line which goes from said view point toward said projection plane;
a function in which, with respect to at least one pixel value memory provided corresponding to a predetermined value and provided with recording regions for respectively recording pixels constituting an image, only when the read-out pixel value first fits to said predetermined value, the pixel data are recorded in the pixel recording region corresponding to the fitted predetermined value; and
a function for reading pixel data recorded in said pixel value memory to form a projection image;
said program being recorded in said recording medium so that a virtual three-dimensional image of an object to be examined formed by stack of a plurality of sectional images or formed of at least one volume image is projected from said view point onto said projection plane to thereby form a projection image.

74. An apparatus for setting a view point in a predetermined position with respect to a virtual three-dimensional image of an object to be examined formed by stack of a plurality of sectional images or formed from at least one volume image and setting a projection plane for projecting said virtual three-dimensional image from said view point so that said virtual three-dimensional image is projected onto said projection plane from said view point to thereby form and display a projection image, comprising:
reading means for reading out pixel values at intervals of a predetermined distance on a projection line with respect to said virtual three-dimensional image crossed by said projection line which goes from said view point toward said projection plane;
at least one pixel value memory provided so as to correspond to a predetermined value and provided with recording regions for recording pixels constituting an image;
recording means in which said recording means records pixel data, only when the pixel value read out by said reading means is first fitted to said predetermined value, in a pixel recording region corresponding to said fitted predetermined value;
pixel data reading means for reading out pixel data recorded in said pixel value memory; and
a display unit for displaying, as a projection image, pixel data read out by said pixel data reading means.

75. A computer-readable recording medium recording thereon a program for executing a method for setting a view point in a predetermined position with respect to a virtual three-dimensional image of an object to be examined formed by stack of a plurality of sectional images or formed from at least one volume image and setting projection plane for projecting said virtual three-dimensional image from said view point so that said virtual three-dimensional image from said view point is projected onto said projection plane to thereby form and display a projection image;
said method comprising:
a reading step of reading out pixel values at intervals of a predetermined distance on a projection line with respect to said virtual three-dimensional image crossed by said projection line which goes from said view point toward said projection plane;
a recording step in which with respect to a plurality of pixel value memories provided respectively corresponding to a plurality of predetermined values different from each other and provided with recording regions for respectively recording pixels constituting an image, when the read-out pixel value fits to one of said predetermined values, the pixel data are recorded in the pixel recording region corresponding to the fitted predetermined value; and
a display step of reading out said pixel data stored in said pixel value memory and displaying said pixel data as a projection image on a display unit;
wherein said projection image includes at least a first projection image of a first organ or region and a second projection image of a second projection image of a second organ or region, and
wherein said method further comprises a step of displaying said first projection image more emphatically than said second projection image.

76. A computer-readable recording medium according to claim 75, wherein said emphatic displaying is performed by giving different weighting coefficients to said first projection image and said second projection image respectively.

77. A computer-readable recording medium according to claim 75, wherein said emphatic displaying is performed by making luminance different between said first projection image and said second projection image.

78. A computer-readable recording medium according to claim 75, wherein said emphatic displaying is performed by making density different between said first projection image and said second projection image.

79. A computer-readable recording medium according to claim 75, wherein said emphatic displaying is performed by making gradation different between said first projection image and said second projection image.

80. A computer-readable recording medium according to claim 75, further comprising a step of displaying information indicating degree of the emphasis adjacently to the emphasized projection image.

81. A computer-readable recording medium according to claim 75, further comprising a step of displaying a not-emphasized projection image and an emphasized projection image or a plurality of differently emphasized projection images adjacently to each other.

* * * * *